United States Patent
Bassin et al.

(10) Patent No.: US 9,052,981 B2
(45) Date of Patent: *Jun. 9, 2015

(54) SYSTEM AND METHOD TO MAP DEFECT REDUCTION DATA TO ORGANIZATIONAL MATURITY PROFILES FOR DEFECT PROJECTION MODELING

(71) Applicant: INTERNATIONAL BUSINESS MACHINES CORPORATION, Armonk, NY (US)

(72) Inventors: Kathryn A. Bassin, Harpursville, NY (US); Steven Kagan, Burr Ridge, IL (US); Susan E. Skrabanek, Talking Rock, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,440

(22) Filed: Sep. 30, 2013

(65) Prior Publication Data

US 2014/0033166 A1 Jan. 30, 2014

Related U.S. Application Data

(63) Continuation of application No. 12/558,327, filed on Sep. 11, 2009, now Pat. No. 8,578,341.

(51) Int. Cl.
*G06F 9/44* (2006.01)
*G06Q 10/06* (2012.01)

(52) U.S. Cl.
CPC .. *G06F 8/70* (2013.01); *G06F 8/20* (2013.01); *G06Q 10/06* (2013.01)

(58) Field of Classification Search
CPC .............. G06F 8/70; G06F 8/20; G06Q 10/06
USPC ................................ 717/101–103, 127–133
See application file for complete search history.

(56) References Cited

U.S. PATENT DOCUMENTS

| | | | |
|---|---|---|---|
| 5,539,652 A | 7/1996 | Tegethoff | |
| 5,651,111 A | 7/1997 | McKeeman et al. | |
| 5,724,273 A | 3/1998 | Desgrousilliers et al. | |
| 5,854,924 A | 12/1998 | Rickel et al. | |
| 5,905,856 A | 5/1999 | Ottensooser | |

(Continued)

OTHER PUBLICATIONS

John McGarry et al., "Practical Software Measurement: A guide to Objective program insight", 1996, Version 2.1, Part 1 to Part 4, pp. i-xvi, 1-282.*

Geir Jonsson, "A Case Study into the Effects of Software Process Improvement on Product Quality", Jun. 2004, Master's Thesis—University of Iceland, pp. i-x, 1-82.*

(Continued)

*Primary Examiner* — Ted T Vo
(74) *Attorney, Agent, or Firm* — Matthew Chung; Roberts Mlotkowski Safran & Cole, P.C.

(57) ABSTRACT

A method is implemented in a computer infrastructure having computer executable code tangibly embodied on a computer readable storage medium having programming instructions. The programming instructions are operable to receive a maturity level for an organization and select at least one defect analysis starter/defect reduction method (DAS/DRM) defect profile based on the maturity level. Additionally, the programming instructions are operable to determine a projection analysis for one or more stages of the life cycle of a software code project of the organization based on the at least one DAS/DRM defect profile.

20 Claims, 28 Drawing Sheets

(56) References Cited

U.S. PATENT DOCUMENTS

| | | | |
|---|---|---|---|
| 6,154,876 | A | 11/2000 | Haley et al. |
| 6,186,677 | B1 | 2/2001 | Angel et al. |
| 6,332,211 | B1 | 12/2001 | Pavela |
| 6,442,748 | B1 | 8/2002 | Bowman-Amuah |
| 6,456,506 | B1 | 9/2002 | Lin |
| 6,477,471 | B1 | 11/2002 | Hedstrom et al. |
| 6,519,763 | B1 | 2/2003 | Kaufer et al. |
| 6,546,506 | B1 | 4/2003 | Lewis |
| 6,601,017 | B1 | 7/2003 | Kennedy et al. |
| 6,601,233 | B1 | 7/2003 | Underwood |
| 6,725,399 | B1 | 4/2004 | Bowman |
| 6,766,473 | B2 | 7/2004 | Nozuyama |
| 6,889,167 | B2 | 5/2005 | Curry |
| 6,901,535 | B2 | 5/2005 | Yamauchi et al. |
| 6,988,055 | B1 | 1/2006 | Rhea et al. |
| 7,080,351 | B1 | 7/2006 | Kirkpatrick et al. |
| 7,200,775 | B1 | 4/2007 | Rhea et al. |
| 7,219,287 | B1 | 5/2007 | Toutounchi et al. |
| 7,231,549 | B1 | 6/2007 | Rhea et al. |
| 7,334,166 | B1 | 2/2008 | Rhea et al. |
| 7,451,009 | B2 | 11/2008 | Grubb et al. |
| 7,630,914 | B2 | 12/2009 | Veeningen et al. |
| 7,788,647 | B2 | 8/2010 | Martin et al. |
| 7,809,520 | B2 | 10/2010 | Adachi |
| 7,861,226 | B1 | 12/2010 | Episkopos et al. |
| 7,886,272 | B1 | 2/2011 | Episkopos et al. |
| 7,917,897 | B2 | 3/2011 | Bassin et al. |
| 7,984,304 | B1 | 7/2011 | Waldspurger et al. |
| 8,001,530 | B2 | 8/2011 | Shitrit |
| 8,191,044 | B1 | 5/2012 | Berlik et al. |
| 8,539,438 | B2 | 9/2013 | Bassin et al. |
| 8,578,341 | B2 * | 11/2013 | Bassin et al. ............... 717/130 |
| 2001/0052108 | A1 | 12/2001 | Bowman-Amuah |
| 2002/0078401 | A1 | 6/2002 | Fry |
| 2002/0188414 | A1 | 12/2002 | Nulman |
| 2003/0018952 | A1 | 1/2003 | Roetzheim |
| 2003/0033191 | A1 | 2/2003 | Davies et al. |
| 2003/0058277 | A1 | 3/2003 | Bowman-Amuah |
| 2003/0070157 | A1 | 4/2003 | Adams et al. |
| 2003/0196190 | A1 | 10/2003 | Ruffolo et al. |
| 2004/0205727 | A1 | 10/2004 | Sit et al. |
| 2004/0225465 | A1 | 11/2004 | Pramanick et al. |
| 2004/0267814 | A1 | 12/2004 | Ludwig et al. |
| 2005/0021766 | A1 | 1/2005 | McKeowen et al. |
| 2005/0071807 | A1 | 3/2005 | Yanavi |
| 2005/0102654 | A1 | 5/2005 | Henderson et al. |
| 2005/0114828 | A1 | 5/2005 | Dietrich et al. |
| 2005/0144529 | A1 | 6/2005 | Gotz et al. |
| 2005/0209866 | A1 | 9/2005 | Veeningen et al. |
| 2005/0283751 | A1 | 12/2005 | Bassin et al. |
| 2006/0047617 | A1 | 3/2006 | Bacioiu et al. |
| 2006/0123389 | A1 | 6/2006 | Kolawa et al. |
| 2006/0248504 | A1 | 11/2006 | Hughes |
| 2006/0251073 | A1 | 11/2006 | Lepel et al. |
| 2006/0265188 | A1 | 11/2006 | French et al. |
| 2007/0100712 | A1 | 5/2007 | Kilpatrick et al. |
| 2007/0101215 | A1 | 5/2007 | Holmqvist |
| 2007/0112879 | A1 | 5/2007 | Sengupta |
| 2007/0168744 | A1 | 7/2007 | Pal et al. |
| 2007/0174023 | A1 | 7/2007 | Bassin et al. |
| 2007/0234294 | A1 | 10/2007 | Gooding |
| 2007/0283325 | A1 | 12/2007 | Kumar |
| 2007/0283417 | A1 | 12/2007 | Smolen et al. |
| 2007/0300204 | A1 | 12/2007 | Andreev et al. |
| 2008/0010543 | A1 | 1/2008 | Yamamoto et al. |
| 2008/0016415 | A1 | 1/2008 | Ide |
| 2008/0022167 | A1 | 1/2008 | Chung et al. |
| 2008/0052707 | A1 | 2/2008 | Wassel et al. |
| 2008/0072328 | A1 | 3/2008 | Walia et al. |
| 2008/0092108 | A1 | 4/2008 | Corral |
| 2008/0092120 | A1 | 4/2008 | Udupa et al. |
| 2008/0104096 | A1 | 5/2008 | Doval et al. |
| 2008/0162995 | A1 | 7/2008 | Browne et al. |
| 2008/0178145 | A1 | 7/2008 | Lindley |
| 2008/0201611 | A1 | 8/2008 | Bassin et al. |
| 2008/0201612 | A1 | 8/2008 | Bassin et al. |
| 2008/0255693 | A1 | 10/2008 | Chaar et al. |
| 2009/0070734 | A1 | 3/2009 | Dixon et al. |
| 2010/0005444 | A1 | 1/2010 | McPeak |
| 2010/0145929 | A1 | 6/2010 | Burger et al. |
| 2010/0211957 | A1 | 8/2010 | Lotlikar et al. |
| 2010/0275263 | A1 | 10/2010 | Bennett et al. |
| 2010/0332274 | A1 | 12/2010 | Cox et al. |
| 2011/0296371 | A1 | 12/2011 | Marella |
| 2012/0017195 | A1 | 1/2012 | Kaulgud et al. |
| 2012/0053986 | A1 | 3/2012 | Cardno et al. |

OTHER PUBLICATIONS

Notice of Allowance dated Sep. 24, 2013 in related U.S. Appl. No. 13/902,034, 8 pages.

Notice of Allowance dated Oct. 15, 2013 in related U.S. Appl. No. 12/558,382, 9 pages.

Notice of Allowance dated Nov. 1, 2013 in related U.S. Appl. No. 12/557,886, 15 pages.

Kwinkelenberg, R. et al., "Smartesting for Dummies", Oct. 14, 2008, Wiley, 36 pages.

Lazic, L. et al., "Cost Effective Software Test Metrics", WSEAS Transactions on Computers, Issue 6, vol. 7, Jun. 2008, pp. 559-619.

Hou, R. et al., Optimal Release Times for Software Systems with Scheduled Delivery Time Based on the HGDM, IEEE Transaction on Computer, vol. 46, No. 2, Feb. 1997, pp. 216-221.

Boehm, B., "Software Engineering Economics", IEEE Transactions on Software Engineering, vol. SE-19, No. 1, Jan. 1984, pp. 4-21.

Basili, V. et al., "Comparing the Effectiveness of Software Testing Strategies", IEEE Transactions on Software Engineering, vol. SE-13, No. 12, Dec. 1987, pp. 1278-1296.

LSU (Estimating Project Costs & Time, Louisiana State University, dated Jul. 25, 2004; retrieved online Oct. 18, 2012; URL: http://laspace.lsu.edu/aces/Lectures/Management/Lecture%205%20-%20Estimating%20Costs.ppt).

Holden, I. et al., "Imporving Testing Efficiency using Cumulative Test Analysis", Proceedings of the Testing: Academic & Idustrial conference—Practice and Research Techniques, IEEE, 2006, pp. 1-5.

Holden, I., "Improving Testing Efficiency using Cumulative Test Analysis", 2006, 25 slices, retrieved from http://www2006.taicpart.org/presentations/session5/3.pdf, pp. 1-25.

Tonella, P., "Publication List", 2012, retrieved from http://selab.fbk.eu/tonella/papersbyyear.html, 15 pages.

Ponaraseri, S. et al., "Using the Planning Game for Test Case Prioritization", retrieved from http:selab.fbk.eu/tonella/papers/issre2008.pdf, 2008, pp. 1-10.

Ambler, S., "Choosing the Right Software Method for the Job", http://web.archive.org/web/20090219074845/http://agiledata.org/essays/differentStrategies.html, retrieved Jun. 7, 2012, pp. 1-14.

Unknown, "ASTQB-ISTQB Software Testing Certification : ISTQB Syllabi", http://web.archive.orb/web/20090423053623/http://www.astqb.org/educational-resources/syllabi-management5.php, retrieved Jun. 7, 2012, pp. 1-12.

Hurlbut, "Managing Domain Architecture Evolution Through Adaptive Use Case and Business Rule Models", 1997, pp. 1-42.

Ulrich, "Test Case Dependency Processing in Robot Framework", https://groups.google.com/forum/?fromgroups#!topic/robotframework-users/twcycBNLXI4, Google, Feb. 16, 2009, pp. 1-4.

Chan et al., "A Tool to Support Perspective Based Approach to Software Code Inspection", Proceedings of the 2005 Australian Software Engineering Conference, IEEE, 2005, 8 pages.

Office Action dated Mar. 14, 2014 in related U.S. Appl. No. 12/558,324, 14 pages.

Office Action dated Mar. 17, 2014 in related U.S. Appl. No. 13/923,581, 13 pages.

Notice of Allowance dated Aug. 20, 2014 in related U.S. Appl. No. 13/923,581, 11 pages.

Office Action dated Oct. 10, 2014 in related U.S. Appl. No. 12/558,324, 13 pages.

Notice of Allowance dated Jul. 7, 2014 in related U.S. Appl. No. 12/558,263, 9 pages.

Office Action dated Jan. 9, 2015 in related U.S. Appl. No. 14/510,296 12, pages.

* cited by examiner

| RED = Maturity Level 1 | | |
|---|---|---|
| Initial Assessment Maturity Area: | Score: | Impact: | Comments: |
| Methodology | 1 (RED) | These 3 areas will have the most significant impact on DRM signatures | |
| Skills | | | |
| Measurements & Controls | | | |
| Technology | Most likely 1, but can be as high as 3 | Not a significant impact on DRM signatures when otherwise RED | When Methodology, Skills, and Measurements & Controls are all RED, it is extremely unlikely Technology could realistically reach as high as 4 |
| Culture | Most likely also 1 or 2, but either or both can be as high as 4 | | Culture and Organization are the most dynamic of all the maturity areas, and at any given point in time, they may rise or fall along the 1-4 range more or less independently of the other areas. This is because any time individuals controlling organizations change roles, Culture and Organization are typically quickly and directly impacted - either positively or negatively. |
| Organization | | | |

FIG. 3

| ORANGE = Maturity Level 2 {400} | | |
|---|---|---|
| Initial Assessment Maturity Area: {305} | Score: {310} | Impact: {315} Comments: {320} |
| Methodology | 2 (ORANGE) | These 3 areas will have the most significant impact on DRM signatures |
| Skills | | |
| Measurements & Controls | | |
| Technology | Most likely 2 or 1, but can be as high as 4 | Not a significant impact on DRM signatures when otherwise ORANGE |
| Culture | Most likely also 2 or 1, but either or both can be as high as 4 | Culture and Organization are the most dynamic of all the maturity areas, and at any given point in time, they may rise or fall along the 1-4 range more or less independently of the other areas. This is because any time individuals controlling organizations change roles, Culture and Organization are typically quickly and directly impacted -either positively or negatively. |
| Organization | | |

FIG. 4

Initial Assessment:

| Key Areas (Facets) | 1 – Unfocused | 2 – Aware | 3 – Capable | 4 - Mature | 5 - World Class |
|---|---|---|---|---|---|
| Culture | No mission defined, no agreement on or understanding of objectives | General awareness of mission and performance criteria | Mission and objectives defined and understood by most | Mission and objectives defined and understood by all | Mission promoted by all and created with the users. Objectives championed by all |
| Methodology | Not defined or applied, or occasionally in a reactive mode | Some activities done, only for major events | Some activities planned on a regular basis | Many activities done, some measurement and reporting | All activities done with involvement of all key participants |
| Technology | None | General tools, low usage, little automation | Effective use of some tools, some tool integration | Effective use with some tools, with some integration and automation | Effective use of a wide range of tools and technology basis |
| Organization | No owner, no definition of roles | Multiple owners, no agreed to roles | Multiple owners, assigned roles | Single owner, role documented, authority understood | Owner does continuous improvement, roles kept current |
| Skills | Few skills in technologies and disciplines | Limited skills on some technologies and disciplines | Solid skills cover key technologies and disciplines | Solid skills set covering most technologies and disciplines | Continuously maintained and deployed skill sets |
| Measurement & Controls | None | Focus on quantity, not quality | Emphasis on components, routine processes are optimized | Emphasis on end to end, most processes are optimized | In line with business objectives, all processes optimized |

FIG. 8

Initial Assessment:

| Key Areas (Facets) | Maturity Level | | | | |
|---|---|---|---|---|---|
| | 1 – Unfocused | 2 – Aware | 3 – Capable | 4 – Mature | 5 – World Class |
| Culture | No mission defined, no agreement on or understanding of objectives | General awareness of mission and performance criteria | Mission and objectives defined and understood by most | Mission and objectives defined and understood by all | Mission promoted by all and created with the users. Objectives championed by all |
| Methodology | Not defined or applied, or occasionally in a reactive mode | Some activities done, only for major events | Some activities planned on a regular basis | Many activities done,, some measurement and reporting | All activities done with involvement of all key participants |
| Technology | None | General tools, low usage, little automation | Effective use of some tools, some tool integration | Effective use with some tools, with some integration and automation | Effective use of a wide range of tools and technology basis |
| Organization | No owner, no definition of roles | Multiple owners, no agreed to roles | Multiple owners, assigned roles | Single owner, role documented, authority understood | Owner does continuous improvement, roles kept current |
| Skills | Few skills in technologies and disciplines | Limited skills on some technologies and disciplines | Solid skills cover key technologies and disciplines | Solid skills set covering most technologies and disciplines | Continuously maintained and deployed skill sets |
| Measurement and Controls | None | Focus on quantity, not quality | Emphasis on components, routine processes are optimized | Emphasis on end to end, most processes are optimized | In line with business objectives, all processes optimized |

FIG. 12

| TRIGGER SIGNATURE L1 MATURITY= | | HIGH LEVEL Reqs/Design Review | DETAILED Reqs/Design Review | Code Inspect | Unit Test | System Test (ST) | System INT Test | Perfor-mance Test | User Accept Test | TOTAL |
|---|---|---|---|---|---|---|---|---|---|---|
| % OF INVESTMENT in ACTIVTY | ST owned by dev: | 1% | 0% | 2% | 5% | 14% | 50% | 3% | 25% | 100% |
| | ST owned by 3rd party: | | | | | 50% | 29% | | 10% | 100% |
| Design Conform | | 100% | 100% | 20% | | >8% | >8% | | >11% | |
| Logic/Flow | | | | 80% | | | | | | |
| Lateral Compat | | | | | | | | | | |
| Language | | | | | | | | | | |
| Side Effects | | | | | | | | | | |
| Concurrency | | | | | | | | | | |
| Backward Compat | | | | | | | | | | |
| Rare Situations | | | | | | | | | | |
| Simple Path | | | | | 100% | | | | | |
| Complex Path | | | | | | | | | | |
| Coverage | | | | | | >60% | >60% | 70% | >35% | |
| Variation | | | | | | <25% | <25% | | <20% | |
| Sequencing | | | | | | <2% | <2% | | <2% | |
| Interaction | | | | | | <5% | <5% | | <6% | |
| Recovery | | | | | | | | | | |
| Soft Config | | | | | | | | | <2% | |
| Hard Config | | | | | | | | | <2% | |
| Work/Stress | | | | | | | | 30% | | |
| Start/Restart | | | | | | | | | | |
| Blocked Test | | | | | | | | | | |
| TOTAL: | | 100% | 100% | 100% | 100% | 100% | 100% | 100% | 100% | |

FIG. 13

| VALID/INVALID CATEGORY SIGNATURE L1 MATURITY = | | HIGH LEVEL Reqs/Design Review | DETAILED Reqs/Design Review | Code Inspect | Unit Test | System Test (ST) | System INT Test | Perform-ance Test | User Accept Test | TOTAL |
|---|---|---|---|---|---|---|---|---|---|---|
| % OF INVESTMENT in ACTIVTY | ST owned by dev: | 1% | 0% | 2% | 5% | 14% | 50% | 3% | 25% | 100% |
| | ST owned by 3rd party: | | | | | 50% | 29% | | 10% | 100% |
| Valid | ST owned by dev: | | | | | 100% | 61% or less | 94% or more | 64% or less | |
| | ST owned by 3rd party: | | | | | 59% or less | | | | |
| Working as Designed | | | | | | 10-15% | 10-15% | | 10-15% | |
| Tester Error | | | | | | 12 - 25% | 10-15% | | 10-15% | |
| Cannot Recreate | | | | | | 5 - 10% | 5-10% | | 5-10% | |
| Duplicate | | | | | | 5 - 10% | 5-10% | | 5-10% | |
| Cancelled | | | | | | 8 - 15% | 5-10% | | | |
| Out of Scope | | | | | | 0 - 5% | 0-5% | 0-3% | 0-5% | |
| New Requirement | | | | | | 0 - 5% | 0-5% | | 0-5% | |
| Deferred | | | | | | 0 - 5% | 0-5% | 0-3% | 0-5% | |
| TOTAL | | 0% | 0% | 0% | 0% | 100% | 100% | 100% | 100% | |

FIG. 14

| TARGET SIGNATURE L1 MATURITY= | | HIGH LEVEL Reqs/Design Review | DETAILED Reqs/Design Review | Code Inspect | Unit Test | System Test (ST) | System INT Test | Performance Test | User Accept Test | TOTAL |
|---|---|---|---|---|---|---|---|---|---|---|
| % OF INVESTMENT in ACTIVITY | ST owned by dev: | 1% | 0% | 2% | 5% | 14% | 50% | 3% | 25% | 100% |
| | ST owned by 3rd party: | | | | | 50% | 29% | | 10% | 100% |
| Requirements/ Design/Code | | <93% | <93% | 100% | 100% | 59% or less | 61% or less | 98% or more | 64% or less | |
| Data | | | | | | 10-15% | 10-15% | | 10% | |
| Environment | | | | | | 20-30% | 20-30% | | 20% | |
| Documentation | | <5% | <5% | | | 5-10% | 5-10% | <2% | 0-5% | |
| Build/Package | | <2% | <2% | | | 5-10% | 5-10% | | 0-5% | |
| National Language Support | | | | | | 0-5% | 0-5% | | 0-5% | |
| TOTAL | | 100% | 100% | 100% | 100% | 100% | 100% | 100% | 100% | |

FIG. 15

| TRIGGER SIGNATURE L2 MATURITY= | | HIGH LEVEL Reqs/Design Review | DETAILED Reqs/Design Review | Code Inspect | Unit Test | System Test (ST) | System INT Test | Performance Test | User Accept Test | TOTAL |
|---|---|---|---|---|---|---|---|---|---|---|
| % OF INVESTMENT T in ACTIVTY | ST owned by dev: | 4% | 1% | 3% | 6% | 20% | 45% | 3% | 18% | 100% |
| | ST owned by 3rd party: | | | | | 55% | 20% | | 8% | 100% |
| Design Conform | | >92% | >77% | 20% | | >7% | >7% | | >9% | |
| Logic/Flow | | | 20% | 80% | | | | | | |
| Lateral Compat | | 0-5% | | | | | | | | |
| Language | | | | | | | | | | |
| Side Effects | | | | | | | | | | |
| Concurrency | | | | | | | | | | |
| Backward Compat | | 0-2% | 0-2% | | | | | | | |
| Rare Situations | | | | | | | | | | |
| Simple Path | | | | | 95% | | | | | |
| Complex Path | | | | | 5% | | | | | |
| Coverage | | | | | | >55% | >55% | 60% | >40% | |
| Variation | | | | | | <30% | <30% | | <38% | |
| Sequencing | | | | | | <2% | <2% | | <2% | |
| Interaction | | | | | | <6% | <6% | | <7% | |
| Recovery | | | | | | | | | | |
| Soft Config | | | | | | | | | <2% | |
| Hard Config | | | | | | | | | <2% | |
| Work/Stress | | | | | | | | 40% | | |
| Start/Restart | | | | | | | | | | |
| Blocked Test | | | | | | | | | | |
| TOTAL | | 100% | 100% | 100% | 100% | 100% | 100% | 100% | 100% | |

FIG. 16

| VALID/INVALID CATEGORY SIGNATURE L2 MATURITY = | | HIGH LEVEL Reqs/Design Review | DETAILED Reqs/ Design Review | Code Inspect | Unit Test | System Test (ST) | System INT Test | Performance Test | User Accept Test | TOTAL |
|---|---|---|---|---|---|---|---|---|---|---|
| % OF INVESTMENT in ACTIVTY | ST owned by dev: | 4% | 1% | 3% | 6% | 20% | 45% | 3% | 18% | 100% |
|  | ST owned by 3rd party: |  |  |  |  | 55% | 20% |  | 8% | 100% |
| Valid | ST owned by dev: |  |  |  |  | 100% | 62-69% | 94% or more | 65-71% |  |
|  | ST owned by 3rd party: |  |  |  |  | 60-66% |  |  |  |  |
| Working as Designed |  |  |  |  |  | (10-15%) | 10-15% |  | 10-15% |  |
| Tester Error |  |  |  |  |  | (10-15%) | 10-15% |  | 10-15% |  |
| Cannot Recreate |  |  |  |  |  | (5-10%) | 5-10% |  | 5-10% |  |
| Duplicate |  |  |  |  |  | (5-10%) | 5-10% |  | 5-10% |  |
| Cancelled |  |  |  |  |  | (5-10%) | 5-10% |  | 5-10% |  |
| Out of Scope |  |  |  |  |  | (0-5%) | 0-5% | 0-3% | 0-5% |  |
| New Requirement |  |  |  |  |  | (0-5%) | 0-5% |  | 0-5% |  |
| Deferred |  |  |  |  |  | (0-5%) | 0-5% | 0-3% | 0-5% |  |
| TOTAL |  | 0% | 0% | 0% | 0% | 100% | 100% | 100% | 100% |  |

FIG. 17

| TRIGGER SIGNATURE L3 MATURITY= | | HIGH LEVEL Reqs/Design Review | DETAILED Reqs/ Design Review | Code Inspect | Unit Test | System Test (ST) | System INT Test | Performance Test | User Accept Test | TOTAL |
|---|---|---|---|---|---|---|---|---|---|---|
| % OF INVESTMENT in ACTIVTY | ST owned by dev: | 6% | 5% | 5% | 8% | 20% | 38% | 3% | 17% | 100% |
| | ST owned by 3rd party: | | | | | 48% | 20% | | 5% | 100% |
| Design Conform | | 70% | 30% | 10% | | 0-5% | 0-5% | | 0-5% | |
| Logic/Flow | | | 50% | 70% | | | | | | |
| Lateral Compat | | 20% | 10% | 10% | | | | | | |
| Language | | | | | | | | | | |
| Side Effects | | 3% | 5% | 5% | | | | | | |
| Concurrency | | | | | | | | | | |
| Backward Compat | | 0-5% | 0-5% | 0-5% | | | | | | |
| Rare Situations | | 2% | | | | | | | | |
| Simple Path | | | | | 80% | | | | | |
| Complex Path | | | | | 20% | | | | | |
| Coverage | | | | | | 40-50% | 40-50% | 50% | 40-45% | |
| Variation | | | | | | 35-40% | 35-40% | | 40% | |
| Sequencing | | | | | | 0-5% | 0-5% | | 5% | |
| Interaction | | | | | | 5-10% | 5-10% | | 10% | |
| Recovery | | | | | | 0-3% | | | | |
| Soft Config | | | | | | 0-2% | 0-5% | | 0-1% | |
| Hard Config | | | | | | | | | 0-1% | |
| Work/Stress | | | | | | | | 50% | | |
| Start/Restart | | | | | | | | | | |
| Blocked Test | | | | | | | | | | |
| TOTAL: | | 100% | 100% | 100% | 100% | 100% | 100% | 100% | 100% | |

FIG. 19

| VALID/INVALID CATEGORY SIGNATURE L3 MATURITY = | HIGH LEVEL Reqs/Design Review | DETAILED Reqs/Design Review | Code Inspect | Unit Test | System Test (ST) | System INT Test | Performance Test | User Accept Test | TOTAL |
|---|---|---|---|---|---|---|---|---|---|
| % OF INVESTMENT in ACTIVTY — ST owned by dev: | 6% | 5% | 5% | 8% | 20% | 38% | 3% | 15% | 100% |
| ST owned by 3rd party: | | | | | 48% | 20% | | 5% | 100% |
| Valid | | | | | 67-73% | 70-77% | 94% | 72-78% | |
| Working as Designed | | | | | 0-5% | 8-13% | | 3-6% | |
| Tester Error | | | | | | 8-13% | | 3-6% | |
| Cannot Recreate | | | | | 5-10% | 3-8% | | 1-4% | |
| Duplicate | | | | | | 3-8% | | 1-4% | |
| Cancelled | | | | | | 3-8% | | 3-6% | |
| Out of Scope | | | | | 5-10% | 0-3% | 0-3% | 0-3% | |
| New Requirement | | | | | 5-10% | 0-3% | | 0-3% | |
| Deferred | | | | | 5-10% | 0-3% | 0-3% | 0-3% | |
| TOTAL: | 0% | 0% | 0% | 0% | 100% | 100% | 100% | 100% | |

FIG. 20

| TARGET SIGNATURE L3 MATURITY= | | HIGH LEVEL Reqs/Design Review | DETAILED Reqs/Design Review | Code Inspect | Unit Test | System Test (ST) | System INT Test | Performance Test | User Accept Test | TOTAL |
|---|---|---|---|---|---|---|---|---|---|---|
| % OF INVESTMENT in ACTIVTY | ST owned by dev: | 6% | 5% | 5% | 8% | 20% | 38% | 3% | 15% | 100% |
| | ST owned by 3rd party: | | | | | 48% | 20% | | 5% | 100% |
| Requirements/ Design/Code | | <93% | <92% | 100% | 100% | 67-73% | 70-74% | 99% | 72-78% | |
| Data | | | | | | 7-10% | 7-10% | | 0-5% | |
| Environment | | | | | | 15-20% | 15-20% | | 0-10% | |
| Documentation | | <5% | <5% | | | 0-5% | 0-5% | <1% | 0-5% | |
| Build/Package | | | | | | 0-5% | 0-5% | | 0-5% | |
| National Language Support | | <2% | <3% | | | 0-5% | 0-5% | | 0-5% | |
| TOTAL: | | 100% | 100% | 100% | 100% | 100% | 100% | 100% | 100% | |

| TRIGGER SIGNATURE L4 MATURITY= | | HIGH LEVEL Reqs/Design Review | DETAILED Reqs/Design Review | Code Inspect | Unit Test | System Test (ST) | System INT Test | Performance Test | User Accept Test | TOTAL |
|---|---|---|---|---|---|---|---|---|---|---|
| % OF INVESTMENT in ACTIVTY | ST owned by dev: | 6% | 10% | 6% | 9% | 19% | 35% | 3% | 12% | 100% |
| | ST owned by 3rd party: | | | | | 45% | 17% | | 4% | 100% |
| Design Conform | | 60% | 30% | 10% | | | | | | |
| Logic/Flow | | 10% | 45% | 70% | | | | | | |
| Lateral Compat | | 20% | 10% | 10% | | | | | | |
| Language | | | | | | | | | | |
| Side Effects | | 3% | 5% | 5% | | | | | | |
| Concurrency | | | 5% | | | | | | | |
| Backward Compat | | 0-5% | 0-5% | 0-5% | | | | | | |
| Rare Situations | | 2% | | | | | | | | |
| Simple Path | | | | | 70% | | | | | |
| Complex Path | | | | | 30% | | | | | |
| Coverage | | | | | | 35-40% | 35-40% | 25% | 35% | |
| Variation | | | | | | 40-45% | 40-45% | | 50% | |
| Sequencing | | | | | | 4-6% | 4-6% | | 5% | |
| Interaction | | | | | | 8-12% | 8-12% | | 10% | |
| Recovery | | | | | | 2-4% | 2-4% | | | |
| Soft Config | | | | | | | | | | |
| Hard Config | | | | | | 1-3% | 1-3% | 75% | | |
| Work/Stress | | | | | | | | | | |
| Start/Restart | | | | | | | | | | |
| Blocked Test | | | | | | | | | | |
| TOTAL: | | 100% | 100% | 100% | 100% | 100% | 100% | 100% | 100% | |

| TARGET SIGNATURE L4 MATURITY= | | HIGH LEVEL Reqs/Design Review | DETAILED Reqs/Design Review | Code Inspect | Unit Test | System Test (ST) | System INT Test | Performance Test | User Accept Test | TOTAL |
|---|---|---|---|---|---|---|---|---|---|---|
| % OF INVESTMENT in ACTIVTY | ST owned by dev: | 6% | 10% | 6% | 9% | 19% | 35% | 3% | 12% | 100% |
| | ST owned by 3rd party: | | | | | 45% | 17% | | 4% | 100% |
| Requirements/ Design/Code | | <92% | <03% | 100% | 100% | 74-79% | 77-81% | 99% | 79-84% | |
| Data | | | | | | 5-7% | 5-7% | | 0-5% | |
| Environment | | | | | | 10-13% | 10-13% | | 0-10% | |
| Documentation | | <6% | <6% | | | 0-3% | 0-3% | <1% | 0-3% | |
| Build/Package | | | <4% | | | 0-3% | 0-3% | | 0-3% | |
| National Language Support | | <2% | | | | 0-3% | 0-3% | | 0-3% | |
| TOTAL: | | 100% | 100% | 100% | 100% | 100% | 100% | 100% | 100% | |

| TRIGGER SIGNATURE L5 MATURITY= | | HIGH LEVEL Reqs/Design Review | DETAILED Reqs/ Design Review | Code Inspect | Unit Test | System Test (ST) | System INT Test | Performance Test | User Accept Test | TOTAL |
|---|---|---|---|---|---|---|---|---|---|---|
| % OF INVESTMENT in ACTIVTY | ST owned by dev: | 8% | 15% | 7% | 10% | 18% | 29% | 3% | 10% | 100% |
| | ST owned by 3rd party: | | | | | 37% | 16% | | 4% | 100% |
| Design Conform | | 60% | 25% | 10% | | | | | | 100% |
| Logic/Flow | | 10% | 45% | 60% | | | | | | 100% |
| Lateral Compat | | 20% | 10% | 10% | | | | | | 100% |
| Language | | | | | | | | | | 100% |
| Side Effects | | 3% | 10% | 10% | | | | | | 100% |
| Concurrency | | | 5% | 5% | | | | | | 100% |
| Backward Compat | | 0-5% | 0-5% | 0-5% | | | | | | 100% |
| Rare Situations | | 2% | | | | | | | | 100% |
| Simple Path | | | | | 60% | | | | | 100% |
| Complex Path | | | | | 40% | | | | | 100% |
| Coverage | | | | | | 15-34% | 15-34% | 20% | 15% | 100% |
| Variation | | | | | | 46-52% | 46-52% | | 60% | 100% |
| Sequencing | | | | | | 5-7% | 5-7% | | 5% | 100% |
| Interaction | | | | | | 10-15% | 10-15% | | 15% | 100% |
| Recovery | | | | | | 0-5% | 0-5% | | | 100% |
| Soft Config | | | | | | | | | | 100% |
| Hard Config | | | | | | | | | | 100% |
| Work/Stress | | | | | | 0-5% | 0-5% | 80% | 0-5% | 100% |
| Start/Restart | | | | | | | | | | 100% |
| Blocked Test | | | | | | | | | | 100% |
| TOTAL: | | 100% | 100% | 100% | 100% | 100% | 100% | 100% | 100% | |

| VALID/INVALID CATEGORY SIGNATURE L5 MATURITY = | HIGH LEVEL Reqs/ Design Review | DETAILED Reqs/ Design Review | Code Inspect | Unit Test | System Test (ST) | System INT Test | Performance Test | User Accept Test | TOTAL |
|---|---|---|---|---|---|---|---|---|---|
| % OF INVESTMENT in ACTIVTY — ST owned by dev: | 8% | 15% | 7% | 10% | 18% | 29% | 3% | 10% | 100% |
| ST owned by 3rd party: | | | | | 37% | 16% | | 4% | 100% |
| Valid | | | | | 80-90% | 85-99% | 98% | 97% | |
| Working as Designed | | | | | 0-3% | 0-6% | | 0-1% | |
| Tester Error | | | | | 0-3% | 0-6% | | 0-1% | |
| Cannot Recreate | | | | | 0-3% | 0-3% | | 0-3% | |
| Duplicate | | | | | 0-3% | 0-3% | | 0-2% | |
| Cancelled | | | | | 0-2% | 0-1% | | 0-1% | |
| Out of Scope | | | | | 0-2% | 0-1% | 0-1% | 0-2% | |
| New Requirement | | | | | 0-2% | 0-1% | | 0-2% | |
| Deferred | | | | | 0-2% | 0-1% | 0-1% | 0-2% | |
| TOTAL: | 0% | 0% | 0% | 0% | 100% | 100% | 100% | 100% | |

| TARGET SIGNATURE L5 MATURITY= | | HIGH LEVEL Reqs/Design Review | DETAILED Reqs/Design Review | Code Inspect | Unit Test | System Test (ST) | System INT Test | Performance Test | User Accept Test | TOTAL |
|---|---|---|---|---|---|---|---|---|---|---|
| % OF INVESTMENT in ACTIVTY | ST owned by dev: | 8% | 15% | 7% | 10% | 18% | 29% | 3% | 10% | 100% |
| | ST owned by 3rd party: | | | | 100% | 37% | 16% | | 4% | 100% |
| Requirements/ Design/Code | | <92% | <90% | 100% | | 80-100% | 80-100% | 99% | 85-100% | |
| Data | | | | | | 3-5% | 3-5% | | 0-5% | |
| Environment | | | | | | 8-11% | 8-11% | | 0-10% | |
| Documentation | | <6% | <6% | | | 0-2% | 0-2% | | 0-2% | |
| Build/Package | | <2% | <4% | | | 0-2% | 0-2% | | 0-2% | |
| National Language Support | | | | | | 0-2% | 0-2% | | 0-2% | |
| TOTAL: | | 100% | 100% | 100% | 100% | 100% | 100% | 100% | 100% | |

SYSTEM AND METHOD TO MAP DEFECT REDUCTION DATA TO ORGANIZATIONAL MATURITY PROFILES FOR DEFECT PROJECTION MODELING

FIELD OF THE INVENTION

The present invention generally relates to defect projection modeling, and more particularly, to a method and system to map defect reduction data to organizational maturity profiles for defect projection modeling.

BACKGROUND

While software systems continue to grow in size and complexity, business demands continue to require shorter development cycles. This has led software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for companies developing software.

To improve product quality many organizations devote an increasing share of their resources to testing and identifying problem areas related to software and the process of software development. Accordingly, it is not unusual to include a quality assurance team in software development projects to identify defects in the software product during and after development of a software product. By identifying and resolving defects before marketing the product to customers, software developers can assure customers of the reliability of their products, and reduce the occurrence of post-sale software fixes such as patches and upgrades which may frustrate their customers.

Testing and identifying problem areas related to software development may occur at different points or stages in a software development lifecycle. For example, a general software development lifecycle includes a high level requirements/design review, a detailed requirements/design review, code inspection, unit test, system test, system integration test, potentially a performance test, and typically, a user acceptance test. Moreover, as the software development lifecycle proceeds from high level requirements/design review to user acceptance test, costs for detecting and remedying software defects generally increases, e.g., exponentially.

As such, software developers may seek to detect and remedy software defects as early in the software development lifecycle in an effort to avoid the increased risks and costs of detecting and remedying these software defects later in the software development lifecycle. To aid in detecting these software defects, an organization may utilize historical defect data for a project (e.g., a software code project) in order to project future defect patterns and trends for the project.

However, consistently accurate defect projection modeling in complex system integration testing is considered impossible absent significant project history. That is, conventionally, historical defect data for a project (e.g., a software code project) must be available in order to accurately project future defect patterns and trends for the project. However, for example, at the earliest stages of the software development lifecycle (when defects are less costly to identify and remedy), historical defect data (e.g., data from a past project) may not be available. For example, in some cases, there may be no past projects to use for historical defect data (or, they are not sufficiently similar to use for planning the new project). At the earliest stages of the software development cycle, when there is no or poor historical defect data to rely on, there is no additional project information available that would otherwise help overcome the lack of historical defect data. However, all complex system integration project owners need to be able to accurately project defect rates in order to effectively plan release development, test, and launch activities and costs, frequently with little or no applicable project history available.

Accordingly, there exists a need in the art to overcome the deficiencies and limitations described herein above.

SUMMARY

In a first aspect of the invention, a method is implemented in a computer infrastructure having computer executable code tangibly embodied on a computer readable storage medium having programming instructions. The programming instructions are operable to receive a maturity level for an organization and select at least one defect analysis starter/defect reduction method (DAS/DRM) defect profile based on the maturity level. Additionally, the programming instructions are operable to determine a projection analysis for one or more stages in a life cycle of a software code project of the organization based on the at least one DAS/DRM defect profile.

In another aspect of the invention, a system comprises a defect analysis starter/defect reduction method (DAS/DRM) selection tool operable to receive a maturity level for an organization and select at least one DAS/DRM defect profile based on the maturity level. Additionally, the system comprises a defect projection tool operable to determine a projection analysis for one or more stages in a life cycle of a software code project of the organization based on the at least one DAS/DRM defect profile.

In an additional aspect of the invention, a computer program product comprising a computer usable storage medium having readable program code embodied in the medium is provided. The computer program product includes at least one component operable to receive a maturity level for an organization and select at least one defect analysis starter/defect reduction method (DAS/DRM) defect profile based on the maturity level. Additionally, the programming instructions are operable to determine a projection analysis for one or more stages in a life cycle of a software code project of the organization based on the at least one DAS/DRM defect profile. The projection analysis comprises at least one of expected defect signatures at the one or more stages in the life cycle of the software code project and projected resource investment for one or more stages in the life cycle of the software code project.

In a further aspect of the invention, a computer system for providing a projection analysis based on a maturity level for an organization, the system comprises a CPU, a computer readable memory and a computer readable storage media. Additionally, the system comprises first program instructions to receive the maturity level for the organization and second program instructions to determine the projection analysis for one or more stages in a life cycle of a software code project of the organization based on the maturity level. The first and second program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 3-7 show exemplary tables that set forth guidelines for determining an organization's overall maturity profile based on scores in maturity areas in accordance with aspects of the invention;

FIGS. 8-12 show exemplary tables showing the mapping of the initial assessment maturity areas to the maturity level scores for each of the initial assessment maturity areas in accordance with aspects of the invention;

FIGS. 13-27 show exemplary defect analysis system/defect reduction method (DAS/DRM) defect profiles in accordance with aspects of the present invention.

DETAILED DESCRIPTION

Figure 1:
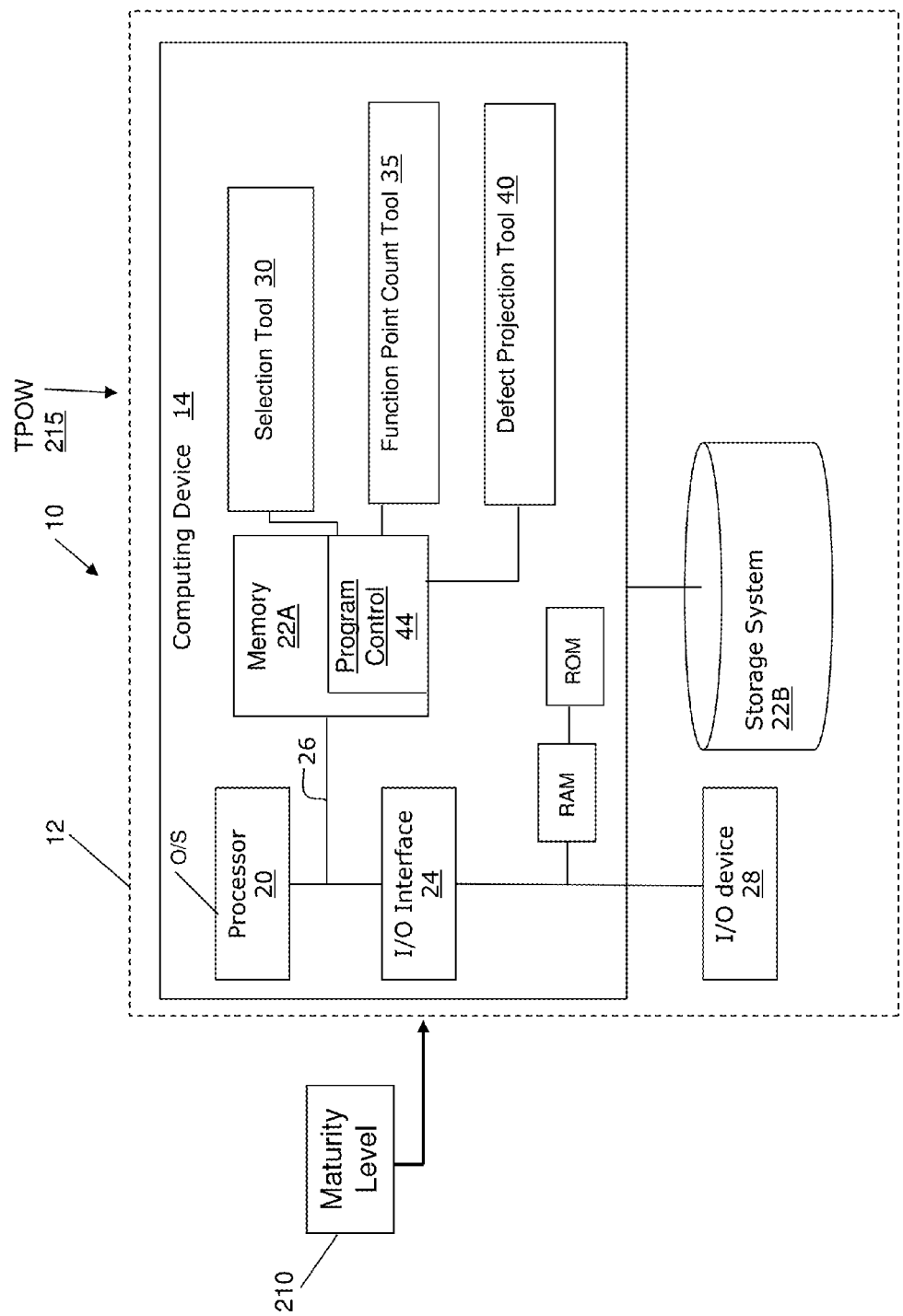
FIG. 1 shows an illustrative environment for implementing the steps in accordance with aspects of the invention.

The present invention generally relates to defect projection modeling, and more particularly, to a method and system to map defect reduction method data to organizational maturity profiles for defect projection modeling. In embodiments, the present invention establishes expected defect patterns and relationships by organizational maturity level, which provide the information necessary to project future defect rates in subsequent testing and/or production. The present invention, for example, may indicate to project planners what defect patterns with respect to particular attributes (as explained further below) they should be expected to encounter throughout the project life cycle based on the organization's maturity level.

A maturity model (or profile) can be described as a collection of elements that describe certain aspects of maturity in, e.g., an organization or an organization's software, and aids in the definition and understanding of an organization's processes. A maturity model provides a comprehensive view across an organization's product development life cycle. A maturity model can be used as a benchmark for comparison and as an aid to understanding, for example, comparative assessment of different organizations where there is something in common that can be used as a basis for comparison. For example, the Capability Maturity Model (CMM) in software engineering is a model of the maturity of the capability of certain business processes. In the case of the CMM, for example, the basis for comparison would be the organizations' software development processes.

With the present invention, a method and system for defect projection modeling is provided within the context of organizational maturity levels on a 1-5 rating scale, wherein a maturity level of "1" indicates a less mature organization and a maturity level of "5" indicates a more mature organization. While the present invention is described, with the 1-5 rating scale, those of ordinary skill in the art will readily recognize that the rating scale is exemplary and that other rating scales may be used. Implementing the invention, a TPOW (Test Planning Optimization Workbench) analysis engine is utilized to produce defect projection modeling scenarios without requiring significant project history as input. In accordance with aspects of the invention, the TPOW determines the organization's defect maturity profile using the organizational maturity level 1, 2, 3, 4 or 5 as the input for the projections, without requiring a past history.

Thus, implementing the present invention allows for accurate projection of future defect patterns and trends, e.g., for code, using an accurate assessment of an organizational maturity level, without needing to analyze historical defect data, e.g., of the code (which may not be available). Moreover, by utilizing maturity profiles to determine a defect projection, the defect projection can be determined without significant project history (beyond an assessment of the organization's maturity level). Furthermore, implementing a comprehensive, accurate defect projection model that utilizes an organization's maturity level solves significant project planning challenges encountered in complex system integration development efforts. No existing model in the industry is capable of providing this degree of comprehensiveness or accuracy with such limited input. Additionally, by implementing the present invention, a defect projection is not limited to only a subset of the kinds of defects that complex system integration projects will encounter in testing or production (e.g., only those code related defects).

Additionally, by implementing the present invention and having the defect projection capability without significant project history greatly enhances complex system integration project planning accuracy with respect to cost, schedule, risk, quality, and improvement targets over time. For example, with an understanding of what defects to expect, an organization can staff resources accordingly. Additionally, for example, understanding what defect patterns and trends are expected given an organization's maturity level allows project owners to set realistic and cost effective improvement targets release to release. Moreover, as less detail of the actual project may be required to determine an understanding what defect patterns and trends are expected within the project, cost-to-build determinations may be performed at an earlier stage and/or at reduced costs.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a test planning optimization workbench (TPOW) 215.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc. In embodiments, the DAS/DRM defect profiles may be stored in storage system 22B or another storage system, which may be, for example, a database.

In general, the processor 20 executes computer program code (e.g., program control 44), which can be stored in the memory 22A and/or storage system 22B. Moreover, in accordance with aspects of the invention, the program control 44 controls the selection tool 30, the function point count tool 35 and the defect projection tool 40. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

The computing device 14 also includes a selection tool 30, a function point count tool 35 and a defect projection tool 40. The selection tool 30 is operable to receive an organization maturity level 210 (e.g., determined by an initial assessment) and select an appropriate defect profile from a DAS/DRM storage system (e.g., stored in storage system 22B) containing defect profiles for each maturity level. The function point count tool 35 is operable to determine a number of defects per thousand lines of code and the defect projection tool 40 is operable to determine a defect projection, e.g., the processes described herein. The selection tool 30, the function point count tool 35 and the defect projection tool 40 can be implemented as one or more program code in the program control 44 stored in memory 22A as separate or combined modules.

Selection Tool

The selection tool 30 is operable to receive an organization maturity level (e.g., determined by an initial assessment, described further below) and select an appropriate defect profile from a DAS/DRM storage system containing defect profiles for each maturity level. For example, if an organization has a maturity profile of "3," e.g., as determined by an initial assessment, the selection tool 30 is operable to receive the organization maturity level and select an appropriate (i.e., maturity level "3") defect profile(s) (or projection analyses).

As discussed further below, in embodiments, the defect profile(s) provide an organization with a projection of defect signatures (e.g., trigger signature, valid/invalid category signatures and/or target signatures, which are discussed further below) for one or more stages of the software development lifecycle. Additionally, in embodiments, the defect profile(s) provide the organization with a resource allocation projection indicating a percentage of resources that should be expended at one or more stages of the software development lifecycle.

Moreover, in accordance with aspects of the invention, as the selection of an appropriate defect profile for an organization's software project is based on an organization's maturity profile, historical defect data for the project is not necessary to accurately project defect rates in order to effectively plan release development, test, and launch activities and costs. As such, the present invention is able to provide a projection analysis with little or no applicable project history available, e.g., earlier in the software development project than otherwise would be possible.

Function Point Count Tool

In order to project a number of defects, a software defect projection model based on KLOC or function point counts may be utilized. KLOC (an acronym for thousand (K) (L)ines (O)f (C)ode) is used to project a number of defects per thousand lines of code. The operation of KLOC counts is well understood by those of ordinary skill in the art. As such, further description of the operation of KLOC or function point counts is not necessary for those of ordinary skill in the art to practice the present invention.

In embodiments, the TPOW 215 includes a function point count tool 35, e.g., a KLOC or SLOC (or (S)ource (L)ines (O)f (C)ode) tool. The function point count tool 35 projects a number of defects, e.g., per thousand lines of code. Thus, for example, the function point count tool 35 may determine a KLOC value of 12, indicating 12 defects for every one thousand lines of software code. Thus, if an organization's software, for example, contains 100,000 lines of code, the function point count tool 35 determines that the software is projected to contain approximately 1,200 defects.

However, software defect projection model based on KLOC or function point counts alone may be of limited value. For example, a software defect projection model based on KLOC will only provide a number of expected defects, and not, for example, anything about the type of expected defects. In other words, KLOC or function point counts alone may provide an organization with how many defects can be expected, but not an indication of, for example, how these defects are or can be found. Thus, in accordance with aspects of the invention, in embodiments, the defect projection tool 40 may combine the function point counts (as determined by the function point count tool 35) and the defect profiles (as determined by the selection tool 30) to provide a defect projection (or projection analysis) 230, as described further below.

Defect Projection Tool

In accordance with further aspects of the invention, the TPOW 215 includes a defect projection tool 40 operable to determine a defect projection (or projection analysis). More specifically, the defect projection tool 40 is operable to receive the appropriate DAS/DRM defect profile(s) (e.g., the trigger defect profile, the valid/invalid category defect profile and/or the target defect profile, described further below) from the selection tool 30. As described above, the DAS/DRM defect profile(s) may indicate an approximate expected number of defects (according to trigger defect profile, valid/invalid category defect profile and/or target defect profile) as relative percentages.

Additionally, in embodiments, the defect projection tool 40 receives the projected number of defects from the function point count tool 35 per lines of code. Utilizing the information provided by the selection tool 30 (e.g., the relative percentages defects with the different defect profiles) and the function point count tool 35 (e.g. the number of defects per thousand lines of code), the defect projection tool 40 determines defect projections 230 comprising, for example, the number of defects per thousand lines of code for defects with the different defect profiles. Moreover, in embodiments, an actual number of lines of code may be input into the defect projection tool 40, such that the defect projection (or projection analysis) may indicate the actual number of expected defects for each of the different defect profiles.

In accordance with aspects of the invention, the defect projection (or projection analysis) may provide an indication of the expected number of defects for an organization's software code. Moreover, the defect projection (or projection analysis) may provide an indication of the expected number of defects having each of the different types of trigger profiles, the different valid/invalid category profiles and/or the different target profiles for an organization's software code. Furthermore, as discussed above, the defect projection 230 for a particular organization's software code is determined according the organization's maturity level, e.g., "1"-"5." That is, for example, the TPOW (Test Planning Optimization Workbench) 215 determines a defect projection (or projection analysis) 230, e.g., defect projection modeling scenarios, by leveraging the organization's defect maturity profile. Put another way, the TPOW 215 transforms an organization's maturity level into a defect projection (or projection analysis).

Thus, the TPOW 215 may determine defect projections (or projection analyses) 230 without requiring input of significant project history. As a result, by implementing the present invention, an organization, for example, does not have to analyze historical defect data for a project (e.g., a software code project) to accurately project future defect patterns and trends for the project when an accurate assessment of their organizational maturity level is determined, e.g., using an initial assessment 205, and the organizational maturity level, e.g., "1," "2," "3," "4" or "5" as an input for the defect projections 230 (or projection analyses).

Using the defect projection (or projection analysis) 230, the organization may, for example, invest resources in the software design process (e.g., at the different stages), accordingly. Moreover, as discussed further below, the defect projection 230 provides the organization with an estimated number of, for example, trigger profile types, valid/invalid category profile types and/or target profile types for defects expected at each stage in the software development lifecycle.

High Level Flow Diagram

Figure 2:
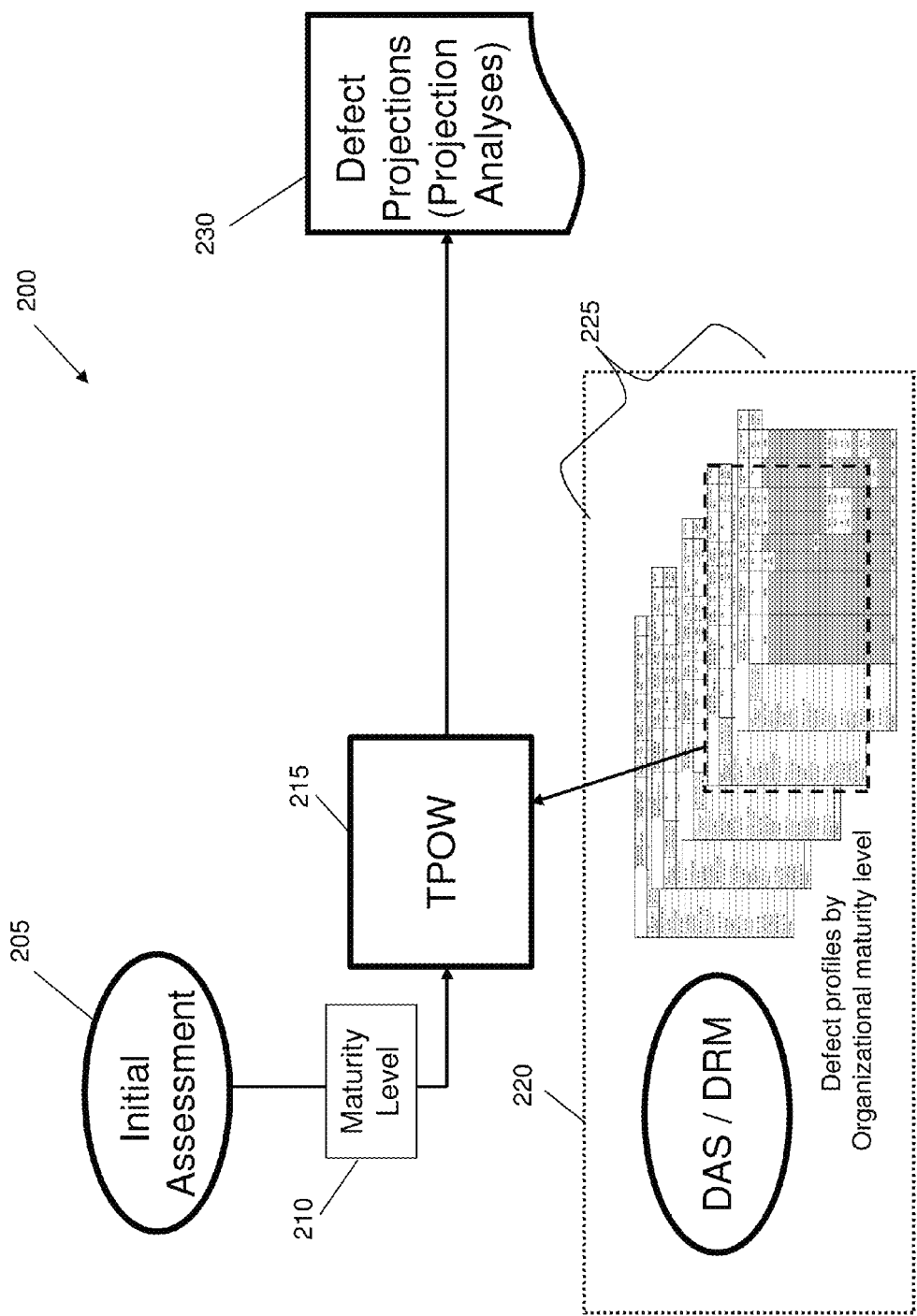
FIG. 2 shows an exemplary depiction of a high level flow in accordance with aspects of the invention.

FIG. 2 illustrates a high level flow 200 in accordance with aspects of the invention. The steps of FIG. 2 may be implemented in the environment of FIG. 1, for example. As shown in FIG. 2, an initial assessment 205 is performed to determine an organization's maturity level. In embodiments, the initial assessment 205 may be performed by the organization, a service provider, and/or by the TPOW 215, amongst others. In any event, the initial assessment 205 determines a maturity level 210 for the organization and this maturity level 210 is received by the TPOW 215 (e.g., the selection tool of FIG. 1).

The TPOW 215 (e.g., the selection tool of FIG. 1) accesses a DAS/DRM system 220 (in embodiments, stored in storage system 22B of FIG. 1) containing defect profiles 225 for the different organization maturity levels (e.g., 1-5), and selects the appropriate defect profile(s) based upon the received maturity level 210. The defect profiles can be, for example, in a tabular format. This is shown in FIGS. 13-27, which are described further below. The DAS/DRM system 220, described further below, utilizes a classification schema for interpreting defects, e.g., defect characteristics.

As further shown in FIG. 2, the TPOW 215 (also shown in FIG. 1) determines defect projections (or projection analysis) 230 for the organization for one or more stages in the software development life cycle based on the received DAS/DRM defect profile(s). As explained further below, in embodiments, the defect projection 230 may provide the organization with percentages of expected defects arising from, e.g., different triggers, and/or may provide the organization with actual numbers of expected defects arising from, e.g., different triggers.

Initial Assessment

As described above, the initial assessment 205 may be performed by the organization, a service provider, and/or by the TPOW system 215, amongst others. FIGS. 3-7 illustrate exemplary tables that set forth guidelines, which may be used to determine an organization's overall maturity profile based on scores in maturity areas, including methodology, skills, measurement and controls, technology, culture and organization. That is, an organization may utilize FIGS. 3-7 to determine their overall maturity level.

Each of these maturity areas (e.g., methodology, skills, measurement and controls, technology, culture and organization) are well known to those ordinarily skilled in maturity models, and a further description of these maturity areas are not necessary for an understanding of the present invention. More specifically, FIGS. 3-7 illustrate exemplary tables for determining an organization's overall maturity level of "1"-"5," respectively. The maturity levels may be designated by colors, for example, maturity levels "1"-"5," may be designated as RED, ORANGE, YELLOW, YELLOW/GREEN and GREEN, respectively.

Each of the exemplary tables illustrated in FIGS. 3-7 include an "Initial Assessment Maturity Area" column 305, which lists the maturity areas and a "Score" column 310, which sets forth a score (or range of scores) for each corresponding maturity area that will indicate the overall maturity level indicated for a respective exemplary table. Additionally, each of the exemplary tables illustrated in FIGS. 3-7 include an "Impact" column 315, which notes an impact of a particular maturity area on the defect reduction methodology (DRM) and a "Comments" column 320, which may provide comments related to respective maturity areas.

More specifically, FIG. 3 illustrates an exemplary table 300 setting forth guidelines for when an organization should receive an overall maturity profile level of 1 (which is also designated RED). Put another way, FIG. 3 illustrates the properties of an organization (e.g., the scores in the individual maturity areas) having an overall maturity level of "1." As indicated in FIG. 3, an organization should receive a maturity level of "1" if the methodology, skills and measurement & controls maturity area scores are each "1," the technology maturity area score is between "1" and "3," and the culture and organization maturity areas scores are each between "1" and "4." Additionally, as indicated in the "Impact" column 310, the methodology, skills and measurement & controls maturity areas will have the most significant impact on DRM, and the technology, culture and organization maturity areas do not have a significant impact on DRM when the other maturity areas have a score of "1." As noted in the "Comments" column 320, when methodology, skills, and measurements & controls are all RED, it is extremely unlikely technology could realistically reach as high as "4." Additionally as noted in the "Comments" column 320, Culture and Organization are the most dynamic of all the maturity areas, and at any given point in time, they may rise or fall along the "1"-"4" range more or less independently of the other areas, because, for example, any time individuals controlling organizations change roles, Culture and Organization are typically quickly and directly impacted, either positively or negatively.

FIG. 4 illustrates an exemplary table 400 setting forth guidelines for when an organization should receive an overall maturity profile level of "2" (which is also designated ORANGE). Put another way, FIG. 4 illustrates the properties of an organization (e.g., the scores in the individual maturity areas) having an overall maturity level of "2." As indicated in FIG. 4, an organization should receive a maturity level of "2" if the methodology, skills and measurement & controls maturity area scores are each "2," the technology maturity area score is between "1" and "4," and the culture and organization maturity areas scores are each between "1" and "4." Additionally, as indicated in the "Impact" column 310, the methodology, skills and measurement & controls maturity areas will have the most significant impact on DRM, and the technology, culture and organization maturity areas do not have a significant impact on DRM when the other maturity areas indicate an overall maturity level of "2." Furthermore, as noted in the "Comments" column 320, Culture and Organization are the most dynamic of all the maturity areas, and at any given point in time, they may rise or fall along the "1"-"4" range more or less independently of the other areas, because, for example, any time individuals controlling organizations change roles, Culture and Organization are typically quickly and directly impacted, either positively or negatively.

Figure 5:
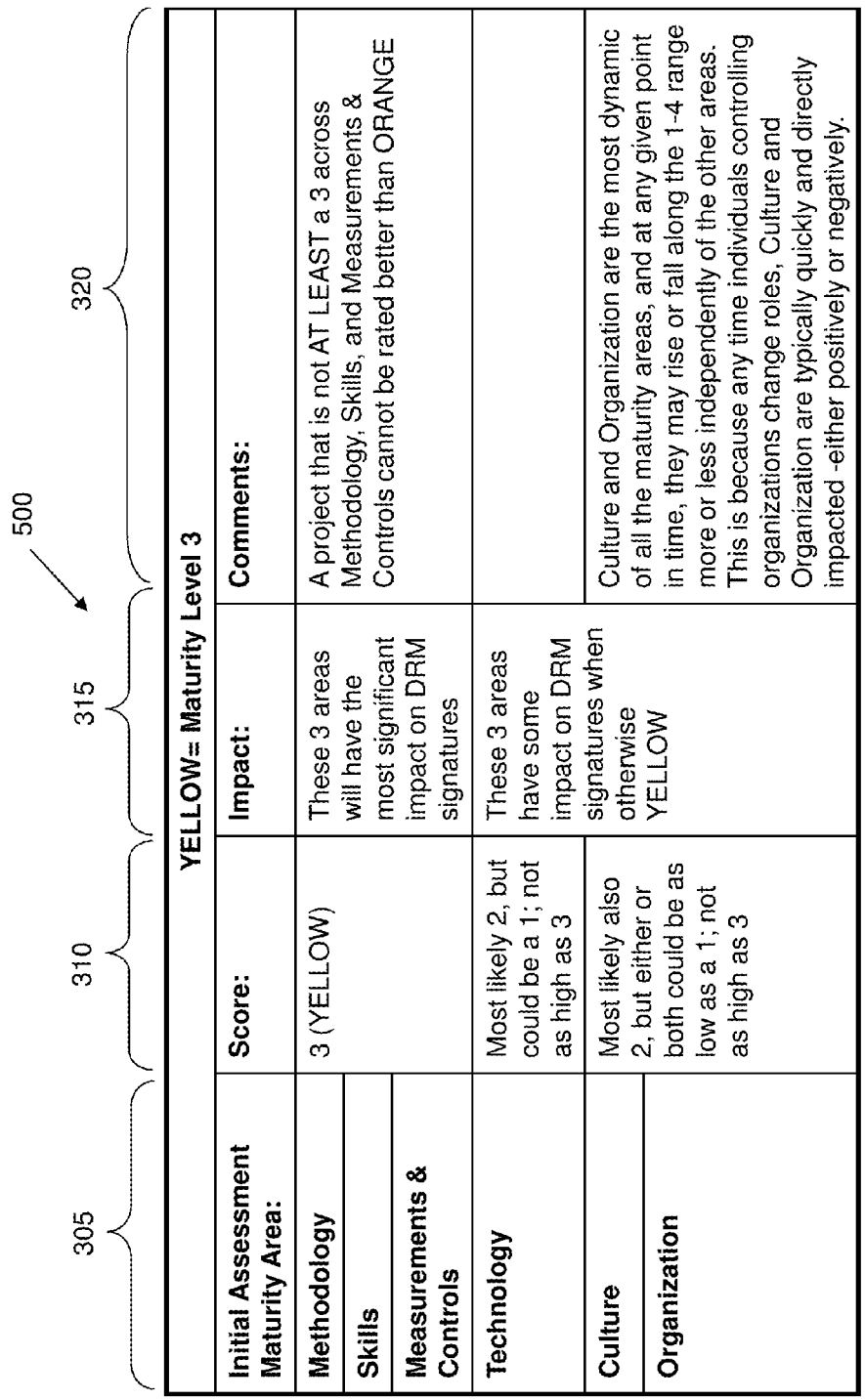

FIG. 5 illustrates an exemplary table 500 setting forth guidelines for when an organization should receive an overall maturity profile level of "3" (which is also designated YELLOW). Put another way, FIG. 5 illustrates the properties of an organization (e.g., the scores in the individual maturity areas) having an overall maturity level of "3." As indicated in FIG. 5, an organization should receive a maturity level of "3" if the methodology, skills and measurement & controls maturity area scores are each "3," the technology maturity area score is between "1" and "2," and the culture and organization maturity areas scores are each between "1" and "2." Additionally, as indicated in the "Impact" column 310, the methodology, skills and measurement & controls maturity areas will have the most significant impact on DRM, and the technology, culture and organization maturity areas have some impact on DRM when the other maturity areas indicate an overall maturity level of "3." Additionally as noted in the "Comments" column 320, a project that is not at least a "3" across Methodology, Skills, and Measurements & Controls cannot be rated better than "2." Moreover as noted in the "Comments" column 320, Culture and Organization are the most dynamic of all the maturity areas, and at any given point in time, they may rise or fall along the "1"-"4" range more or less independently of the other areas, because, for example, any time individuals controlling organizations change roles, Culture and Organization are typically quickly and directly impacted, either positively or negatively.

Figure 6:
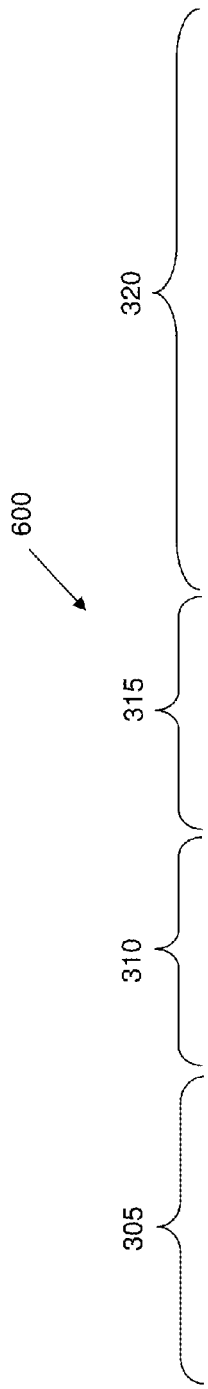

FIG. 6 illustrates an exemplary table 600 setting forth guidelines for when an organization should receive an overall maturity profile level of "4" (which is also designated YELLOW/GREEN). Put another way, FIG. 6 illustrates the properties of an organization (e.g., the scores in the individual maturity areas) having an overall maturity level of "4." As indicated in FIG. 6, an organization should receive a maturity level of "4" if the methodology, skills and measurement & controls maturity area scores are each at least "3" and as high as "4," and the technology, culture and organization maturity areas scores are each at least "3." Additionally, as indicated in the "Impact" column 310, the methodology, skills and measurement & controls maturity areas will have the most significant impact on DRM, and the technology, culture and organization maturity areas have some impact on DRM when the other maturity areas indicate an overall maturity level of "4." Additionally as noted in the "Comments" column 320, Culture and Organization are the most dynamic of all the maturity areas, and at any given point in time, they may rise or fall along the "1"-"4" range more or less independently of the other areas, because, for example, any time individuals controlling organizations change roles, Culture and Organization are typically quickly and directly impacted, either positively or negatively.

Figure 7:
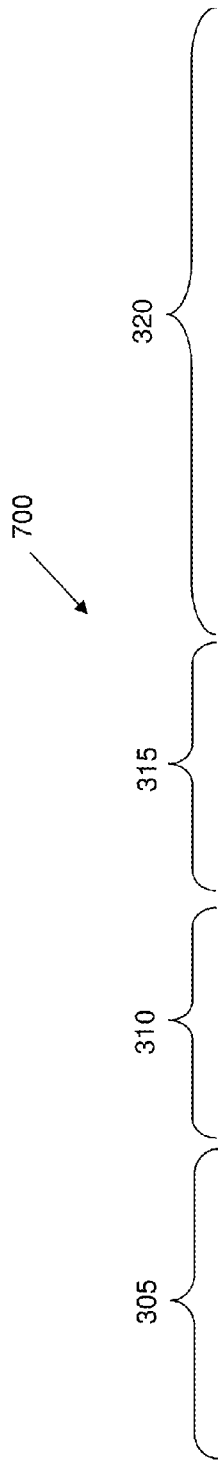
Figure 9:
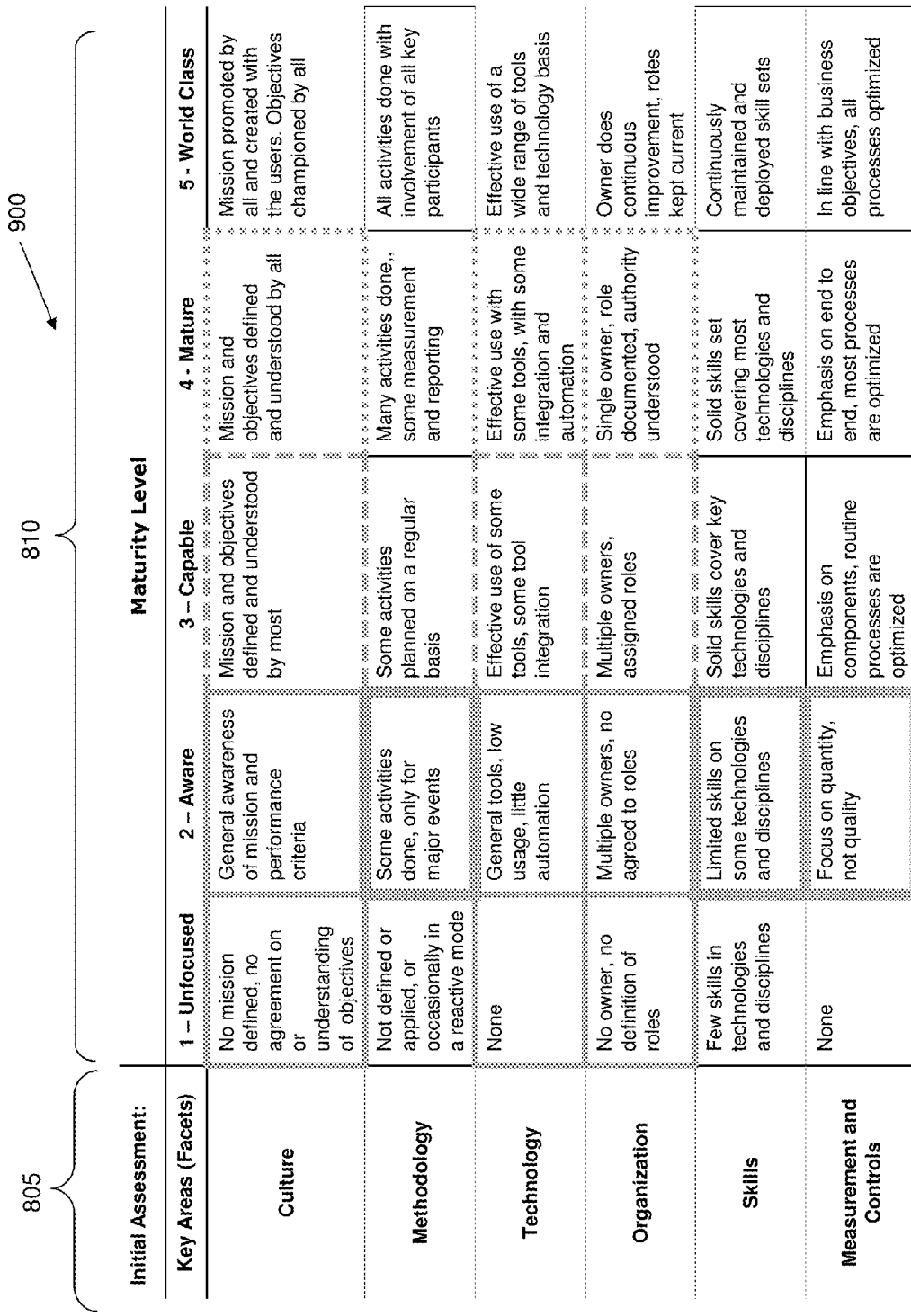
Figure 10:
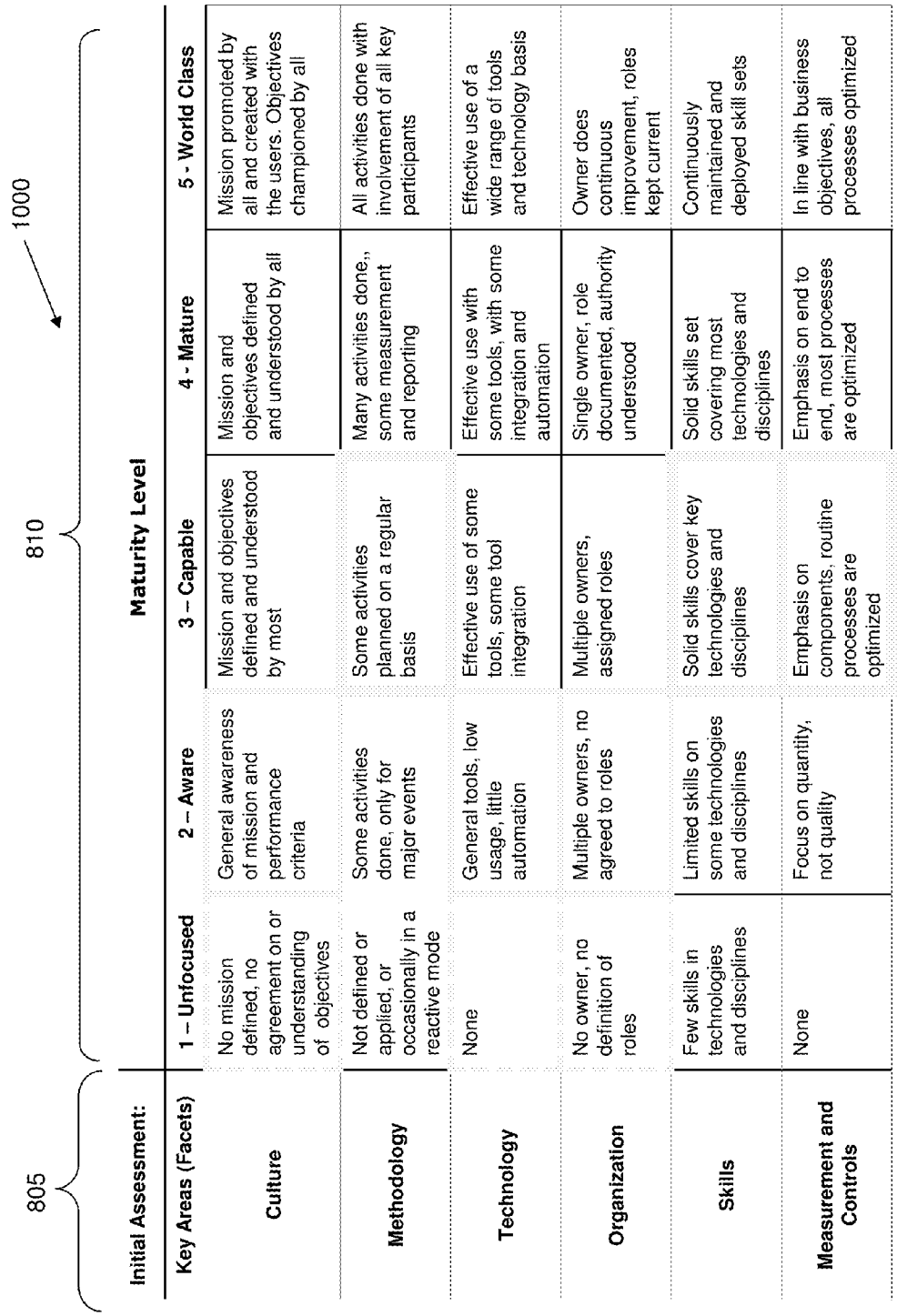
Figure 11:
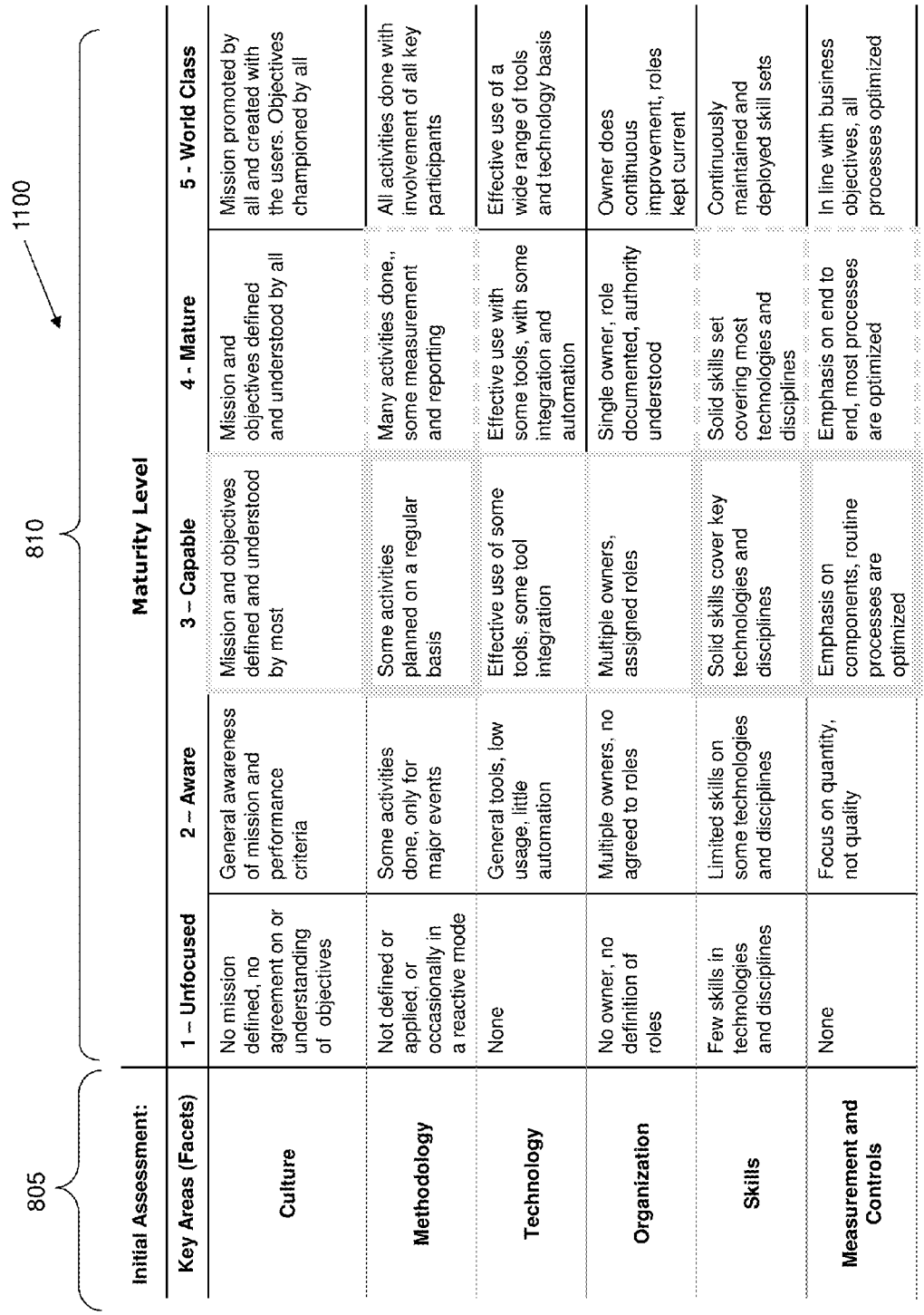

FIG. 7 illustrates an exemplary table 700 setting forth guidelines for when an organization should receive an overall maturity profile level of "5" (which is also designated GREEN). Put another way, FIG. 7 illustrates the properties of an organization (e.g., the scores in the individual maturity areas) having an overall maturity level of "5." As indicated in FIG. 7, an organization should receive a maturity level of "5" if the methodology, skills and measurement & controls maturity area scores are each at least "4," and the technology, culture and organization maturity areas scores are each at least "4." Additionally, as indicated in the "Impact" column 310, the methodology, skills and measurement & controls maturity areas will have the most significant impact on DRM, and the technology, culture and organization maturity areas have some impact on DRM when the other maturity areas indicate an overall maturity level of "5." Additionally as noted in the "Comments" column 320, culture and organization are the most dynamic of all the maturity areas, and at any given point in time, they may rise or fall along the "1"-"4" range more or less independently of the other areas, because, for example, any time individuals controlling organizations change roles, culture and organization are typically quickly and directly impacted, either positively or negatively.

FIGS. 8-12 illustrate exemplary tables showing the mapping of the initial assessment maturity areas to the maturity level scores for each of the initial assessment maturity areas, for overall maturity levels "1"-"5", respectively. FIGS. 8-12 may also be used to determine an organization's overall maturity profile based on scores in maturity areas, including methodology, skills, measurement and controls, technology, culture and organization. That is, for example, an organization may utilize FIGS. 8-12 to determine their overall maturity level.

More specifically, each of FIGS. 8-12 show a "Key Areas" column 805, which lists each of the key areas of the initial assessment (e.g., culture, methodology, technology, organization, skills and measurement & controls) and a maturity level columns 810 (e.g., including: maturity scores "1"-"5"). Additionally, as shown in FIGS. 8-12, a maturity score of "1," (i.e., the lowest maturity level) may be designated as "unfocused," indicating an organization that is not mature (for example, does not include measures to ensure focused software development). In contrast, a maturity score of "5," (i.e., the highest maturity level) may be designated as "world class," indicating an organization that, for example, is very mature (for example, including measures to promote, e.g., high quality software development).

Additionally, FIGS. 8-12 illustrate guidelines for determining a maturity level score for each of the initial assessment maturity areas. For example, with regard to the "Methodology" area, FIGS. 8-12 indicate what level of maturity of an organization's "Methodology" area will result in a particular maturity level (e.g., 1-5) for that area. Thus, if an organization's methodology is determined to be not defined or applied, or occasionally in a reactive mode, then the organization should receive a maturity score of "1" for the methodology area. In contrast, if an organization's methodology indicates that all activities are done with involvement of all key participants, then the organization should receive a maturity score of "5" for the methodology area. As can be observed, the scores (or ranges of scores) for each of the initial assessment maturity areas as indicated in the "Scores" column 310 of FIGS. 3-7 correlate with the highlighted maturity level scores (or ranges of scores) for each of the initial assessment maturity areas of FIGS. 8-12, respectively, as explained further below.

For example, FIG. 8 shows a mapping of possible scores for the different initial assessment areas (e.g., culture, methodology, technology, organization, skills and measurement & controls) that will achieve a maturity level of "1" (or RED). As can be observed, if an organization receives a maturity score of "1" for any of the methodology, skills and measurement & controls areas, then the organization will receive an overall maturity level of "1." Moreover, as can be observed in comparing FIGS. 8 and 3, the mappings shown in FIG. 8 correlate with the scores in the "Scores" column 310 of FIG. 3. FIGS. 9-12 illustrate mappings for overall maturity levels "2"-"5," and respectively correlate with FIGS. 4-7, in a similar manner. As such, further description of FIGS. 4-7 is not necessary for an understanding of the present invention.

In accordance with aspects of the invention, an organization's overall maturity level may be determined using the tables shown in FIGS. 3-12, as explained above. For example, an organization may determine a maturity score for each of the key areas using the provided descriptions, for example, as shown in FIGS. 8-12. That is, for example, if an organization assesses their skills area as limited skills on some technologies and disciplines, then the organization may determine a maturity score for "skills" to be "2." Likewise, the organization may determine maturity scores for the other areas (e.g., culture, methodology, technology, organization and measurement & controls). Using each of the maturity scores, an overall maturity level can be determined, for example, by selecting one the tables of FIGS. 8-12, to which each of the individual maturity scores map.

While the invention has been described above as an organization determining its maturity level, using the above mapping tables (e.g., FIGS. 3-12), it should be understood that the determination of a maturity level may be performed by others, e.g., a service provider. Moreover, while determining a maturity level has been described above as performing an initial assessment, it should be understood that the invention contemplates that a maturity level for an organization may be provided without conducting an initial assessment. For example, an organization may have a service provider perform an analysis of the organization to provide an overall maturity level independently, which is then forwarded to the TPOW 215 in order to determine defect projections, as described further below.

DAS/DRM Defect Profiles

In accordance with further aspects of the invention, a DAS/DRM (or defect analysis starter/defect reduction method)

system 220 contains a plurality of defect profiles. More specifically, the DAS/DRM system 220 contains defect profiles organized by maturity level. As such, the DAS/DRM system 220 includes defect profiles for each of the above-described maturity levels "1"-"5."

Software testing may involve verifying the correctness, completeness, security, quality, etc. of a product. During testing, a technical investigation may be performed by, for example, executing a program or application with the intent to find errors. If errors are found, one or more areas in the software code may be identified based on the errors. Therefore, developers may alter the code in the identified regions to obviate the error.

After a defect has been fixed, data regarding the defect, and the resolution of the defect, may be stored in a database. The defects may be classified and analyzed as a whole using, for example, Orthogonal Defect Classification (ODC). ODC is a commonly used complex quality assessment schema for understanding code related defects uncovered during testing. However, ODC can only handle code related defects.

In accordance with aspects of the invention, the DAS/DRM defect profiles may be derived using, for example, a historical database (e.g., ODC) containing previously classified defects. That is, the DAS/DRM defect profiles (and the approximate values of expected errors having particular profiles and approximate values of investment in activity, contained therein) have been determined by reviewing the database containing previously classified defects and, for example, detecting patterns therein, which is described in U.S. Patent Application Publication No. 2006/0265188, U.S. Patent Application Publication No. 2006/0251073, and U.S. Patent Application Publication No. 2007/0174023, the contents of each of which are hereby incorporated by reference herein in their entirety. As the DAS/DRM defect profiles include all of the information in ODC (e.g., code related defects), plus corresponding depth on non-code related defects, the DAS/DRM defect profiles provide a comprehensive picture about all the defects that project will encounter, and not just the code related ones For each of the maturity levels, the DAS/DRM system 220 may include defect profiles usable for different profiles, including trigger profiles, valid/invalid category profiles, and target profiles. Trigger profiles may be specific conditions present when (or circumstances under which) a defect is uncovered during testing of software code. Thus, as explained further below, the defect profiles based on trigger distributions indicate expected specific conditions present (or circumstances) for a defect to be uncovered as a percentage of overall specific conditions. Accordingly, utilizing the present invention, an organization may direct efforts and/or resources to uncover defects proportionally to the expected specific conditions or circumstances, as indicated by the defect profiles based on trigger distributions. For example, by having a defect projection quantitatively indicating when (e.g., a what stage) defects occur and circumstances, e.g., triggers, surrounding those defects, an organization has a roadmap as to what to defects to expect with their software code project (e.g., how many defects, but also the characteristics of those defects).

Valid/invalid category profiles indicate whether an error is valid or invalid. For example, an error is deemed valid, if corrective action was taken to fix the defect and the defect was closed. In contrast, an error is deemed invalid if no corrective action was taken to fix the defect and the defect was closed. In this case, it may be invalid for a number of reasons, including: working as designed, tester error, cannot recreate, duplicate, cancelled, out of scope, new requirement, and/or deferred.

Thus, the defect profile based on valid/invalid category distributions indicates an expected percentage of errors that are valid and an expected percentage of errors that are invalid (and why, e.g., working as designed, tester error, cannot recreate, duplicate, cancelled, out of scope, new requirement, and/or deferred), based on an organization's overall maturity level.

Accordingly, utilizing the present invention, an organization may direct effort to uncover defects proportionally to the expected valid defects and invalid defects, as indicated by the defect profiles based on valid/invalid category distributions. For example, by having a defect projection quantitatively indicating when (e.g., a what stage) defects occur and an indication of valid/invalid types, surrounding those defects, an organization has a roadmap as to what defects to expect with their software code project (e.g., how many defects, but also the characteristics of those defects).

Target profiles indicate a high level categorization of the type of defect. For example, the target distribution may indicate one of: a requirements/design/code defect (i.e., a defect that is related to the substantive system code), versus other kinds of defects, such as data defects, environment defects, documentation defects, build/package defects, and national language support defects. Thus, the defect profile based on target distributions indicates an expected percentage of errors for each type of defect by target, based on an organization's overall maturity level. Accordingly, utilizing the present invention, an organization may direct effort to uncover defects proportionally to the expected targets (or high level types of defects), as indicated by the defect profiles based on target distributions. For example, by having a defect projection quantitatively indicating when (e.g., a what stage) defects occur and the types (e.g., code, vs. data, vs. environment, etc.) of those defects, an organization has a roadmap as to what to defects to expect with their software code project (e.g., how many defects but also the characteristics of those defects).

FIGS. 13-15 illustrate exemplary DAS/DRM defect profiles for an organization having an overall maturity level of "1." As should be understood, the exemplary DAS/DRM defect profiles shown in FIGS. 13-15 (and FIGS. 16-27) illustrate a possible implementation of defect profiles. However, the invention contemplates that the DAS/DRM defect profiles may take another form that those shown in FIGS. 13-15 (and FIGS. 16-27). For example, defect profile data may be in a non-tabular form. As such, the exemplary illustrations of the DAS/DRM defect profiles shown in FIGS. 13-15 (and FIGS. 16-27) should not be construed as limiting the present invention.

More specifically, FIG. 13 illustrates a DAS/DRM defect profile 1300 for an organization having an overall maturity level of "1" according to trigger distributions. FIG. 14 illustrates a DAS/DRM defect profile 1400 for an organization having an overall maturity level of "1" according to valid/invalid category distributions. FIG. 15 illustrates a DAS/DRM defect profile 1500 for an organization having an overall maturity level of "1" according to target distributions.

As shown in FIG. 13, the DAS/DRM defect profile 1300 for overall maturity level "1" based on trigger distributions includes life cycle row 1305 which lists the different stages 1320 or activities performed during a software development life cycle (e.g., a high level requirements/design review, a detailed requirements/design review, code inspection, unit test, system test, system integration test, sometimes performance test and typically, user accept test). For example, a software development life cycle begins with a high level requirements/design review and ends with a user acceptance test. Moreover, as illustrated in FIG. 13, as the stages 1320 proceed from left to right across the life cycle row 1305, the cost for fixing defects in software reliably increase. Thus, it is highly desirable to fix defects at earlier stages in the software development life cycle.

Additionally, the DAS/DRM defect profile 1300 includes a percentage of investment in activity row 1310, which indicates an approximate percentage of investment in activity that should be expended at each stage 1320 over a life cycle to uncover defects. As can be observed, the percentage of investment in activity row 1310 splits after the unit test stage depending upon who performs the system test (a functionally oriented test of the individual components of the system, prior to integrating the components). For example, the top portions of the percentage of investment in activity row 1310 indicate an approximate percentage of investment in activity that should be expended at each stage over a life cycle (subsequent to unit test) to uncover defects when the development team (who performed the unit test) also performs the system test. In contrast, the bottom portions of the percentage of investment in activity row 1310 indicate an approximate percentage of investment in activity that should be expended at each stage over a life cycle (subsequent to unit test) to uncover defects when a third party performs the system test. While the "User Accept Test" stage is labeled as such, it should be understood that the invention contemplates that the user acceptance test may be performed by others, e.g., a third party.

Regardless of who performed the system test, subsequent to the system test stage, testing of the software code is typically performed by a third party (not the development teams). Generally, it may be desired that a developer of software (who performed the unit test) not perform the system test; however, this "in-house" system testing often occurs in software development. Unit test (or unit testing) is a software verification and validation method in which, e.g., a programmer tests that individual units of source code are fit for use. A unit may be the smallest testable part of an application. For, example, in procedural programming a unit may be an individual program, function, procedure, etc., while in object-oriented programming, the smallest unit is a class, which may belong to a base/super class, abstract class or derived/child class. Before unit test, any defect is generally in design or requirements as there is generally no code available for testing prior to this stage.

Additionally, the DAS/DRM defect profile 1300 includes trigger profile rows 1315 for each trigger distribution (e.g., design conform, logic/flow, language, etc.). The list of trigger options is an orthogonal list. As such, each particular defect will only accurately fit within one and only one of the triggers. In other words, each defect is counted once and only once. As illustrated in FIG. 13, the trigger options are generally ordered from top to bottom in accordance with when these triggers are experienced in the software development life cycle. For each stage 1320 over the software development life cycle (e.g., as listed in the life cycle row 1305), the DAS/DRM defect profile 1300 indicates an approximate expected percentage of defects having each type of defect trigger at that stage. A totals row 1325 indicates for each stage 1320 the total percentage (i.e., 100%) for its respective column of projected trigger distributions. As should be understood, for each stage 1320 that lists expected defects, the individual percentages listed for each of the projected triggers should sum to 100%.

A totals column 1330 indicates the total percentage in investment activity (i.e., 100%). As should be understood, the individual percentages listed for each stage 1320 should sum to approximately 100%. However, as can be observed, depending on who is performing system test (ST), e.g., the developer (in-house) or a third party, the approximate percentages of investment activity differ for some stages, subsequent to the unit test stage. With either the upper portion (ST performed by developer) of the percentage of investment in activity row 1310 or the lower portion (ST performed by third party) of the percentage of investment in activity row 1310, the summation of each stage 1320 is approximately 100%, as indicated in the totals column 1330.

Thus, for example, as shown in the "Code Inspect" stage column, for an organization with a level "1" maturity, the TPOW software would determine a defect projection that approximately 20% of the organization's defects will have a "Design Conform" trigger and approximately 80% of the organization's defects will have a "Logic/Flow" trigger. Moreover, the approximately 20% "Design Conform" trigger defects and the approximately 80% of "Logic/Flow" trigger defects sum to 100%, as indicated in the totals row 1325.

Additionally, as indicated in the percentage of investment in activity row 1305, for the "Code Inspect" stage, approximately 2% of the total investment of activity should be expended at this stage. In contrast, as indicated in the "Performance Test" column, approximately 3% of the total investment of activity should be expended at this stage for an organization with a level "1" maturity, wherein approximately 70% of the errors are expected to have a "Coverage" trigger and approximately 30% of the errors are expected to have a "Workload/Stress" trigger. As indicated in the "System Test" stage column, if the system test is being performed by the developer (e.g., the organization itself), approximately 14% of the total investment of activity should be expended at this stage. However, if the system test is being performed by a third party, approximately 50% of the total investment of activity should be expended at this stage. When a third party is performing system test, this is likely the first opportunity the third party has to examine the code. As such, the DAS/DRM defect profile 1300 indicates a higher expenditure of investment activity (e.g., a more aggressive test) at the system test stage when a third party is performing system test. Regardless of who performs system test, however, the percentages of expected defect trigger distributions is the same for each stage 1320.

As shown in FIG. 13, the DAS/DRM defect profile 1300 also includes shaded areas. The shaded areas indicate that defects with those particular trigger distributions are not expected to occur at that particular stage. That is, while these very uncommonly occurring defects can occur, for example, in rare situations, these defects would not be expected to occur at stages when the area is shaded out. Thus, these very uncommonly occurring defects would not be part of an expected defect projection.

FIG. 14 illustrates a DAS/DRM defect profile 1400 for an organization having an overall maturity level of "1" according to valid/invalid category profiles. As discussed above, the valid/invalid category indicates whether an error is valid or invalid. For example, an error is valid, if corrective action was taken to fix the defect (e.g., rewriting software code) and the defect was closed. In contrast, an error may be invalid for a number of reasons, including: working as designed, tester error, cannot recreate, duplicate, cancelled, out of scope, new requirement, and/or deferred. Thus, the defect profile based on valid/invalid category distributions indicates an expected percentage of errors that are valid and an expected percentage of errors that are invalid (and why, e.g., working as designed, tester error, cannot recreate, duplicate, cancelled, out of scope, new requirement, and/or deferred), based on an organization's overall maturity level.

Accordingly, utilizing the present invention, an organization may direct effort to uncover defects proportionally to the expected valid defects and invalid defects, as indicated by the defect profiles based on valid/invalid category distributions. For example, by having a defect projection quantitatively indicating when (e.g., a what stage) defects occur and an indication of valid/invalid types, surrounding those defects, an organization has a roadmap as to what to defects to expect with their software code project (e.g., how many defects and the characteristics of those defects). Moreover, an organization may determine, for example, whether and to what extent resources are being expended on valid defects versus invalid defects.

Additionally, the DAS/DRM defect profile 1400 includes valid/invalid profile rows 1415 for the valid distribution and the different invalid distribution types (e.g., working as designed, tester error, duplicate, etc.). The list of valid/invalid options is an orthogonal list. As such, each particular defect will only fit within one and only one of the valid/invalid options. In other words, each defect is counted once and only once. As valid/invalid category distributions for errors are obtained subsequent to unit test, the first four stage columns 1320 are shaded, indicating that no defects are expected at these stages. Moreover, the totals row 1325 indicates "0%" for the stages up to unit test.

As DAS/DRM defect profile 1400 operates in a similar manner to DAS/DRM defect profile 1300 described above, a further description of DAS/DRM defect profile 1400 is not necessary for those of ordinary skill in the art to practice the present invention. However, it should be noted that in a similar manner to the percent of investment in activity row 1310, DAS/DRM defect profile 1400 indicates differing valid category profile defect projections depending upon whether system test is performed by the system developer or a third party.

FIG. 15 illustrates a DAS/DRM defect profile 1500 for an organization having an overall maturity level of "1" according to target profiles. As discussed above, targets indicate a high level type of defect. For example, the target will indicate one of: a requirements/design/code defect, a data defect, an environment defect, a documentation defect, a build/package defect, and a national language support defect. Thus, the defect profile based on target distributions indicates an expected percentage of errors for each kind of defect, based on an organization's overall maturity level. Accordingly, utilizing the present invention, an organization may direct effort to uncover defects proportionally to the expected targets (or high level types of defects), as indicated by the defect profiles based on target distributions. For example, by having a defect projection quantitatively indicating when (e.g., a what stage) defects occur and the types (e.g., code, vs. data, vs. environment, etc.) of those defects, an organization has a roadmap as to what to defects to expect with their software code project (e.g., how many defects and the characteristics of those defects).

Additionally, the DAS/DRM defect profile 1500 includes target profile rows 1515 for the different target options (e.g., requirements/design/code, data, environment, etc.). The list of target options is an orthogonal list. As such, each particular defect will only fit within one and only one of the target options. In other words, each defect is counted once and only once. As DAS/DRM defect profile 1500 operates in a similar manner to DAS/DRM defect profile 1300 described above, a further description of DAS/DRM defect profile 1500 is not necessary for those of ordinary skill in the art to practice the present invention.

Figure 18:
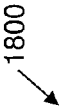

FIGS. 16-18 illustrate DAS/DRM defect profiles for an organization having an overall maturity level of "2." More specifically, FIG. 16 illustrates a DAS/DRM defect profile 1600 for an organization having an overall maturity level of "2" according to the trigger profile. FIG. 17 illustrates a DAS/DRM defect profile 1700 for an organization having an overall maturity level of "2" according to valid/invalid category profile. FIG. 18 illustrates a DAS/DRM defect profile 1800 for an organization having an overall maturity level of "2" according to target distribution. As DAS/DRM defect profiles 1600-1800 operate in respective similar manners to DAS/DRM defect profiles 1300-1500 described above, a further description of DAS/DRM defect profiles 1600-1800 are not necessary for those of ordinary skill in the art to practice the present invention.

FIGS. 19-21 illustrate DAS/DRM defect profiles for an organization having an overall maturity level of "3." More specifically, FIG. 19 illustrates a DAS/DRM defect profile 1900 for an organization having an overall maturity level of "3" according to the trigger profile. FIG. 20 illustrates a DAS/DRM defect profile 2000 for an organization having an overall maturity level of "3" according to the valid/invalid category profile. FIG. 21 illustrates a DAS/DRM defect profile 2100 for an organization having an overall maturity level of "3" according to the target profile. As DAS/DRM defect profiles 1900-2100 operate in respective similar manners to DAS/DRM defect profiles 1300-1500 described above, a further description of DAS/DRM defect profiles 1900-2100 are not necessary for those of ordinary skill in the art to practice the present invention.

Figure 23:

FIGS. 22-24 illustrate DAS/DRM defect profiles for an organization having an overall maturity level of "4." More specifically, FIG. 22 illustrates a DAS/DRM defect profile 2200 for an organization having an overall maturity level of "4" according to the trigger profile, FIG. 23 illustrates a DAS/DRM defect profile 2300 for an organization having an overall maturity level of "4" according to valid/invalid category signature, and FIG. 24 illustrates a DAS/DRM defect profile 2400 for an organization having an overall maturity level of "4" according to the target profile. As DAS/DRM defect profiles 2200-2400 operate in respective similar manners to DAS/DRM defect profiles 1300-1500 described above, a further description of DAS/DRM defect profiles 2200-2400 are not necessary for those of ordinary skill in the art to practice the present invention.

FIGS. 25-27 illustrate DAS/DRM defect profiles for an organization having an overall maturity level of "5." More specifically, FIG. 25 illustrates a DAS/DRM defect profile 2500 for an organization having an overall maturity level of "5" according to the trigger profile, FIG. 26 illustrates a DAS/DRM defect profile 2600 for an organization having an overall maturity level of "5" according to the valid/invalid category profile, and FIG. 27 illustrates a DAS/DRM defect profile 2700 for an organization having an overall maturity level of "5" according to the target profile. As DAS/DRM defect profiles 2500-2700 operate in respective similar manners to DAS/DRM defect profiles 1300-1500 described above, a further description of DAS/DRM defect profiles 2500-2700 are not necessary for those of ordinary skill in the art to practice the present invention.

As can be observed, for example in comparing respective DAS/DRM defect profiles for the different maturity levels ("1"-"5"), e.g., the trigger distributions in the DAS/DRM defect profiles shown in FIGS. 13, 16, 19, 22 and 25, as the maturity level of an organization increases, a larger percentage of the investment in activity is shifted to earlier stages 1320 in the software life cycle. Conversely, as the maturity level of an organization decreases, a larger percentage of the investment in activity is shifted to later stages 1320 in the software life cycle. The shift of investment activity to earlier stages in the software life cycle for organizations having a higher maturity level due to the organization's higher maturity level. That is, for an organization having a higher maturity level, e.g., level "5," it may be more efficient, for example, for the organization to invest in activities (e.g., code design, review and/or testing) at earlier stages 1320 in the software design lifecycle. As discussed above, it may be less expensive to invest in activities at earlier stages in the software life cycle.

Flow Diagram

Figure 28:
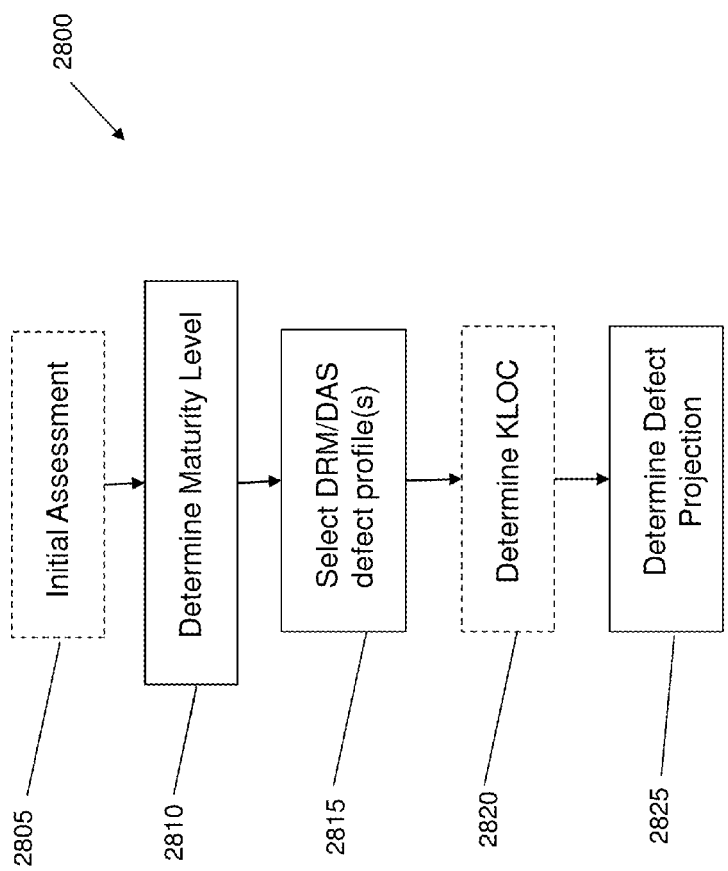
FIG. 28 shows an exemplary flow in accordance with aspects of the invention.

FIG. 28 shows an exemplary flow for performing aspects of the present invention. The steps of FIG. 28 may be implemented in the environment of FIG. 1, for example. The flow diagram may equally represent a high-level block diagram or a swim-lane diagram of the invention. The flowchart and/or block diagram in FIG. 28 illustrates the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 28 depicts an exemplary flow 2800 for a process in accordance with aspects of the present invention. In particular, although not limiting, the flow of FIG. 28 used the information shown in FIGS. 3-27. As shown in FIG. 2800, at optional step 2805, an initial assessment is performed in order to determine an organization's maturity level (e.g., "1"-"5"). An initial assessment may include an evaluation of an organization across a plurality of areas, e.g., methodology, skills, measurements and controls, technology, culture and organization, and a determination of respective maturity scores for each of these areas. Moreover, an overall maturity level may be determined from the respective maturity scores for each of the areas (e.g., using FIGS. 3-7 and/or FIGS. 8-12, described above). In embodiments, the initial assessment may be performed by, for example, the organization, a third party and/or a service provider, amongst others. Additionally, as noted above, in embodiments, guidelines such as those shown in FIGS. 3-7 and FIGS. 8-12 may be utilized to determine an organization's maturity level. In embodiments, it is contemplated that optional step 2805 is not performed, i.e., an initial assessment is not performed, for example, when an organization already knows their maturity level.

At step 2810, an organization's maturity level is received by the TPOW software. At step 2815, the selection tool selects one or more DAS/DRM defect profiles based upon the received maturity level. For example, if an organization has a maturity level of "2," the selection tool will select one or more of the maturity level "2" defect profiles (e.g., maturity level "2" trigger distribution defect profile, maturity level "2" valid/invalid distribution defect profile and/or maturity level "2" target distribution defect profile (examples shown in FIGS. 16-18, respectively)). At optional step 2820, the function point count tool determines a KLOC value for the organization's software code. At step 2825, the defect projection tool determines a defect projection (or projection analysis). For example, utilizing the information provided by the selection tool (e.g., the relative percentages defects with the different defect profiles) and the function point count tool (e.g. the number of defects per thousand lines of code), the defect projection tool determines defect projections 230 comprising, for example, the number of defects per thousand lines of code for defects with the different defect profiles. In embodiments, the defect projection may indicate relative approximate numbers of estimated or projected defects with different distributions (e.g., percentages) or may indicate actual approximate numbers of estimated or projected defects with different distributions (e.g., by including optional step 2820).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage memory having programming instructions operable to:
    determine a maturity level for an organization from a plurality of maturity levels, wherein a plurality of defect profiles are organized within the plurality of maturity levels;
    select at least one defect profile from the plurality of defect profiled based on the determined maturity level for the organization, wherein each of the plurality of maturity levels is associated with at least one of the plurality of defect profiles and each of the plurality of defect profiles comprises approximate expected percentages for defects in one or more stages in a life cycle of a software code project of the organization; and
    provide a projection analysis for the one or more stages in the life cycle of the software code project based on the selected at least one defect profile, the providing the projection analysis comprising:
        utilizing the approximate expected percentages for the defects according to the at least one defect profile; and
        providing an actual number of expected defects in the one or more stages in the life cycle of the software code project,
        wherein the projection analysis comprises the approximate expected percentages for the defects in the one or more stages in the life cycle of the software code project, and at least the step of providing the projection analysis is performed by a processor of the computer infrastructure.

2. The method of claim 1, further comprising determining a thousand lines of code (KLOC) value for the software code project.

3. The method of claim 1, wherein the projection analysis comprises projected resource investment for the one or more stages in the life cycle of the software code project.

4. The method of claim 3, wherein the projected resource investment comprises a percentage of resource investment at each stage of the life cycle of the software code project of a total resource investment over the life cycle of the software code project.

5. The method of claim 4, wherein the projected resource investment additionally comprises:
    a first set of percentage of resource investments at the one or more stages of the life cycle corresponding to an in-house system test; and
    a second set of percentage of resource investments at the one or more stages of the life cycle corresponding to a third party system test.

6. The method of claim 1, wherein the at least one defect profile comprises at least one of a trigger distribution defect profile, a valid/invalid category distribution defect profile and a target distribution defect profile.

7. The method of claim 6, wherein the trigger distribution defect profile comprises:
    a listing of possible triggers;
    projected defects orthogonally classified in the listing of possible triggers; and
    expected percentages for the defects comprise a projected percentage of defects having each of the possible triggers at the one or more stages of the life cycle of the software code project.

8. The method of claim 6, wherein the valid/invalid category distribution defect profile comprises:
    a listing comprising a valid category and a plurality of invalid categories; and
    the approximate expected percentages for the defects orthogonally classified in the listing comprising the valid category and the plurality of invalid categories for each stage of the life cycle of the software code project.

9. The method of claim 8, wherein the approximate expected percentages for the defects comprise a projected percentage of defects having each of the valid category and the plurality of invalid categories at the one or more stages of the life cycle of the software code project.

10. The method of claim 6, wherein the target distribution defect profile comprises:
    a listing of possible targets; and
    the approximate expected percentages for the defects orthogonally classified in the listing of possible targets for each stage of the life cycle of the software code project.

11. The method of claim 10, wherein the approximate expected percentages for the defects comprise a projected percentage of defects having each of the possible targets at the one or more stages of the life cycle of the software code project.

12. The method of claim 1, wherein the computer infrastructure is operable to transform the maturity level for the organization to the projection analysis.

13. The method of claim 1, wherein a service provider at least one of creates, maintains, deploys and supports the computer infrastructure.

14. The method of claim 1, wherein steps are provided by a service provider on a subscription, advertising, and/or fee basis.

15. The method of claim 1, wherein the evaluation of the organization across a plurality of the maturity areas comprises:
    providing a maturity level score for each maturity area of the plurality of the maturity areas, wherein the plurality of the maturity areas comprises a culture area, a methodology area, a technology area, an organization area, a skills area, and a measurements and control area; and
    determining the maturity level of the organization based on the maturity level scores for each maturity area using a plurality of tables that map combinations of possible maturity level scores for the plurality of the maturity areas to possible maturity levels for the organization.

16. The method of claim 1, wherein:
    the selecting the at least one defect profile based on the maturity level comprises selecting three defect profiles comprising the trigger defect profile, the valid/invalid category defect profile, and the target defect profile associated with the maturity level;

the trigger defect profile comprises the approximate expected percentages for defects orthogonally classified in a listing of possible triggers for each stage of a life cycle of a software code project of the organization;

the valid/invalid category defect profile comprises the approximate expected percentages for defects orthogonally classified in a listing comprising a valid category and a plurality of invalid categories for each stage of the life cycle of the software code project;

the target defect profile comprises the approximate expected percentages for defects orthogonally classified in a listing of possible targets for each stage of the life cycle of the software code project; and the projection analysis comprises the approximate expected percentages for the defects classified in the listing of possible triggers, the listing comprising the valid category and the plurality of invalid categories, and the listing of possible targets.

17. A system implemented in hardware, comprising:
a selection tool operable to:
   determine a maturity level for an organization from a plurality of maturity levels, wherein a plurality of defect profiles are organized within the plurality of maturity levels; and
   select at least one defect analysis starter/defect reduction method (DAS/DRM) defect profile based on the determined maturity level, wherein each of the plurality of maturity levels is associated with at least one of the plurality of defect profiles; and
a defect projection tool operable to determine a projection analysis for one or more stages of a life cycle a software code project of the organization based on the at least one DAS/DRM defect profile,
wherein the projection analysis comprises at least one of:
   expected defect profiles at the one or more stages in the life cycle of the software code project; and
   projected resource investment for the one or more stages in the life cycle of the software code project comprising:
      a first set of percentage of resource investments at the one or more stages of the life cycle corresponding to an in-house system test; and
      a second set of percentage of resource investments at the one or more stages of the life cycle corresponding to a third party system test.

18. The system of claim 17, further comprising a function point count tool operable to determine a KLOC value for the software code project.

19. The system of claim 17, wherein:
the at least one DAS/DRM defect profile comprises at least one of a trigger distribution DAS/DRM defect profile, a valid/invalid category distribution DAS/DRM defect profile and a target distribution DAS/DRM defect profile;

the trigger distribution DAS/DRM defect profile comprises:
   a listing of possible triggers; and
   a trigger distribution of projected defects orthogonally classified in the listing of possible triggers, wherein the trigger distribution of projected defects comprise a projected percentage of defects having each of the possible triggers at the one or more stages of the life cycle of the software code project;

the valid/invalid category distribution DAS/DRM defect profile comprises:
   a listing comprising a valid category and a plurality of invalid categories; and
   a valid/invalid category distribution of projected defects orthogonally classified in the listing, wherein the valid/invalid category distribution of projected defects comprise a projected percentage of defects having each of the valid category and the plurality of invalid categories at the one or more stages of the life cycle of the software code project; and the target distribution DAS/DRM defect profile comprises:
   a listing of possible targets; and
   target distributions of projected defects orthogonally classified in the listing of possible targets, wherein the target distribution of projected defects comprise a projected percentage of defects having each of the possible targets at the one or more stages of the life cycle of the software code project.

20. A computer program product comprising a computer readable hardware storage device having readable program code embodied in the hardware storage device, the computer program product includes at least one component operable to:
   determine a maturity level for an organization from a plurality of maturity levels, wherein a plurality of defect profiles are organized within the plurality of maturity levels;
   select at least one defect profile from the plurality of defect profiled based on the determined maturity level for the organization, wherein each of the plurality of maturity levels is associated with the at least one defect profile of the plurality of defect profiles and each of the plurality of defect profiles comprises approximate expected percentages for defects in one or more stages in a life cycle of a software code project of the organization; and
   determine a projection analysis for the one or more stages in the life cycle of the software code project based on the selected at least one defect profile, the determining the projection analysis comprises:
      utilizing the approximate expected percentages for the defects according to the at least one defect profile;
      providing an actual number of expected defects in the one or more stages in the life cycle of the software code project; and
      projecting resource investment for the one or more stages in the life cycle of the software code project.

* * * * *